United States Patent
Lipson et al.

(10) Patent No.: US 8,805,130 B2
(45) Date of Patent: Aug. 12, 2014

(54) SEMICONDUCTOR HIGH-SPEED INTEGRATED ELECTRO-OPTIC DEVICES AND METHODS

(75) Inventors: Michal Lipson, Ithaca, NY (US); Sasikanth Manipatruni, Hillsboro, OR (US); Kyle Preston, Ithaca, NY (US); Bradley Schmidt, Toronto (CA)

(73) Assignee: Cornell University, Ithaca, NY (US)

( * ) Notice: Subject to any disclaimer, the term of this patent is extended or adjusted under 35 U.S.C. 154(b) by 599 days.

(21) Appl. No.: 13/049,400

(22) Filed: Mar. 16, 2011

(65) Prior Publication Data

US 2011/0293216 A1    Dec. 1, 2011

Related U.S. Application Data

(60) Provisional application No. 61/314,466, filed on Mar. 16, 2010.

(51) Int. Cl.

| | |
|---|---|
| *G02B 6/12* | (2006.01) |
| *G02B 6/42* | (2006.01) |
| *G02B 6/28* | (2006.01) |
| *G02B 6/10* | (2006.01) |
| *G02B 6/00* | (2006.01) |
| *G02B 6/43* | (2006.01) |
| *G02B 6/122* | (2006.01) |
| *G02B 6/293* | (2006.01) |
| *G02F 1/313* | (2006.01) |

(52) U.S. Cl.
CPC .............. *G02B 6/43* (2013.01); *G02B 6/12004* (2013.01); *G02B 6/12* (2013.01); *G02B 6/122* (2013.01); *G02B 6/2938* (2013.01); *G02B 6/12007* (2013.01); *G02F 1/3132* (2013.01)
USPC ........ 385/14; 385/2; 385/16; 385/24; 385/41; 385/50; 385/132; 385/141

(58) Field of Classification Search
CPC . H01L 23/49827; H04J 14/02; G02F 2201/12
USPC ........ 385/1–3, 14–16, 24, 32, 40–41, 43, 50, 385/52, 123, 129–132, 141–145; 257/E23.01, E23.067, E23.174, 257/E27.112, E27.122, E31.111, E33.067, 257/E33.069; 359/237–238, 245, 276, 279; 398/43
See application file for complete search history.

(56) References Cited

U.S. PATENT DOCUMENTS

| 5,841,931 A | 11/1998 | Foresi et al. |
| 6,108,464 A | 8/2000 | Foresi et al. |

(Continued)

OTHER PUBLICATIONS

Phosphorus Doping of Low Pressure Chemically Vapor-Deposited Silicon Filmes, M.M. Mandurah and K.C. Saraswat and T.I. Kamins, *J. Electrochem. Soc.*: Solid-State Science and Technology, Jun. 1979, vol. 126, No. 6, 1019-1023.

(Continued)

*Primary Examiner* — Uyen Chau N Le
*Assistant Examiner* — Michael Mooney
(74) *Attorney, Agent, or Firm* — Harris Beach PLLC

(57) ABSTRACT

Novel integrated electro-optic structures such as modulators and switches and methods for fabrication of the same are disclosed in a variety of embodiments. In an illustrative embodiment, a device includes a substrate with a waveguide and an optical resonator comprising polycrystalline silicon positioned on the substrate. First and second doped semiconducting regions also comprise polycrystalline silicon and are positioned proximate to the first optical resonator. The first optical resonator is communicatively coupled to the waveguide.

22 Claims, 6 Drawing Sheets

(56) References Cited

U.S. PATENT DOCUMENTS

| | | | |
|---|---|---|---|
| 6,493,477 | B2 | 12/2002 | Onoe |
| 6,934,427 | B2 | 8/2005 | Lee et al. |
| 7,116,881 | B1 | 10/2006 | Gunn, III et al. |
| 7,136,563 | B1 | 11/2006 | Gunn, III et al. |
| 7,245,792 | B2 | 7/2007 | Liu |
| 7,269,326 | B2 | 9/2007 | Paddon et al. |
| 7,454,102 | B2 | 11/2008 | Keyser et al. |
| 7,826,688 | B1 | 11/2010 | Sadagopan et al. |
| 7,830,588 | B2 | 11/2010 | Miles |
| 7,847,353 | B2 | 12/2010 | Hill et al. |
| 7,941,014 | B1 * | 5/2011 | Watts et al. .................. 385/32 |
| 2010/0002994 | A1 | 1/2010 | Baehr-Jones et al. |
| 2010/0059822 | A1 | 3/2010 | Pinguet et al. |
| 2010/0266233 | A1 | 10/2010 | Morris et al. |

OTHER PUBLICATIONS

Theory of the Electrical and Photovoltaic Properties of Polycrystalline Silicon, Amal K. Ghosh, Charles Fishman and Tom Feng, J. Appl. Phys. 51(1), Jan. 1980, pp. 446-454.

Rationale and Challenges for Optical Interconnects to Electronic Chips, David A. B. Miller, Fellow, IEEE, Proceedings of the IEEE, vol. 88, No. 6, Jun. 2000, pp. 728-749.

Photonic Networks-on-Chip for Future Generations of Chip Multiprocessors, Assaf Shacham, Keren Bergman and Luca P. Carloni, IEEE Transactions on Computers, vol. 57, No. 9, Sep. 2008, pp. 1246-1260.

A High-Speed Silicon Optical Modulator Based on Metal-Oxide-Semiconductor Capacitor, Ansheng Liu, Richard Jones, Ling Liao, Dean Samara-Rubio, Doron Rubin, Oded Cohen, Remus Nicolaescu & Mario Paniccia, Letters to Nature, Nature, vol. 427, Feb. 12, 2004, www.nature.com/nature, © 2004 Nature Publishing Group, pp. 615-618.

High-Speed Optical Modulation Based on Carrier Depletion in a Silicon Waveguide, Ansheng Liu, Ling Liao, Doron Rubin, Hat Nguyen, Berkehan Ciftcioglu, Yoel Chetrit, Namum Izhaky and Mario Paniccia, Jan. 22, 2007, vol. 15, No. 2, Optics Express, pp. 660-668.

Ultra-Compact, Low RF Power, 10 Gb/s Silicon Mach-Zehnder Modulator, William M.J. Green, Michael J. Rooks, Lidija Sekaric and Yurii A. Vlasov, Dec. 10, 2007, vol. 15, No. 25, Optics Express, pp. 17106-17113.

Low Loss and High Speed Silicon Optical Modulator Based on a Lateral Carrier Depletion Structure, Delphine Marris-Morini, Laurent Vivien, Jean Marc Fedeli, Eric Cassan, Philippe Lyan and Suzanne Laval, Jan. 7, 2008, vol. 16, No. 1, Optics Express, pp. 334-339.

CMOS—Compatible Dual-Output Silicon Modulator for Analog Signal Processing, S.J. Spector, M.W. Geis, G.R. Zhou, M.E. Grein, F. Gan, M.A. Popovic, J.U. Yoon, D.M. Lennon, E.P. Ippen, F.X. Kartner and T.M. Lyszczarz, Jul. 21, 2008, vol. 16, No. 15, Optics Express, pp. 11027-11031.

Micrometre-Scale Silicon Electro-Optic Modulator, Qianfan Xu, Bradley Schmidt, Sameer Pradhan & Michal Lipson, Nature, vol. 435, May 19, 2005, doi:10.1038/nature03569, pp. 325-327.

High Speed Carrier Injection 18 Gb/s Silicon Micro-Ring Electro-Optic Modulator, Sasikanth Manipatruni, Qianfan Xu, Bradley Schmidt, Jagat Shakya and Michal Lipson, © 2007 IEEE, pp. 537-538.

Ultralow Power Silicon Microdisk Modulators and Switches, Michael R. Watts, Douglas C. Trotter, Ralph W. Young and Anthony L. Lentine, © 2008 IEEE, pp. 4-6.

12.5 Gbps Optical Modulation of Silicon Racetrack Resonator Based on Carrier-Depletion in Asymmetric P-N Diode, Jong-Bum You, Miran Park, Jeong-Woo Park and Gyungock Kim, Oct. 27, 2008, vol. 16, No. 22, Optics Express, pp. 18340-18344.

Frontiers of Silicon-On-Insulator, G.K. Celler, Journal of Applied Physics—Applied Physics Reviews—Focused Review, vol. 93, No. 9, May 1, 2003, pp. 4955-4978.

Demonstration of an Electronic Photonic Integrated Circuit in a Commercial Scaled Bulk CMOS Process, Jason S. Orcutt, Anatol Khilo, Milos A. Popovic, Charles W. Holzwarth, Benjamin Moss, Hanqing Li, Marcus S. Dahlem, Thomas D. Bonifield, Franz X. Kartner, Erich P. Ippen, Judy L. Hoyt, Rajeev J. Ram and Vladimir Stojanovic, © 2008 OSA / CLEO/QELS 2008, 2 pgs.

Localized Substrate Removal Technique Enabling Strong-Confinement Microphotonics in Bulk Si CMOS Processes, Charles W. Hlzwarth, Jason S. Orcutt, Hanquing Li, Milos A. Popovic, Vladimir Stojanovic, Judy L. Hoyt, Rajeev J. Ram and Henry I. Smith, © 2008 OSA / CLEO/QELS 2008, 2 pgs.

3-D ICs: A Novel Chip Design for Improving Deep-Submicrometer Interconnect Performance and Systems-On-Chip Integration, Kaustav Banerjee, Shukri J. Souri, Pawan Kapur and Krishna C. Saraswat, Proceedings of the IEEE, vol. 89, No. 5, May 2001, pp. 602-633.

Three-Dimensional Integrated Circuits, A.W. Topol, D.C. La Tulipe, Jr., L. Shi, D.J. Frank, K. Bernstein, S.E. Steen, A. Kumar, G.U. Singco, A.M. Young, K.W. Guarini, M. Leong, IBM J. Res. & Dev. vol. 50, No. 4/5 Jul./Sep. 2006, pp. 491-506.

Process Flow Innovations for Photonic Device Integration in CMOS, Mark Beals, J. Michel, J.F. Liu, D.H. Ahn, D. Sparacin, R. Sun, C.Y. Hong and L.C. Kimerling, A. Pomerenc, D. Carothers and J. Beattie, A. Kopa and A. Apsel and M.S. Rasras, D.M. Gill, S.S. Patel, K.Y. Tu, Y.K. Chen and A.E. White, Proc. of SPIE vol. 6898 689804-1-689804-14, Apr. 13, 2008.

Precision Tunable Silicon Compatible Microring Filters, Reja Amatya, Charles W. Holzwarth, Henry I. Smith and Rajeev J. Ram, IEEE Photonics Technology Letters, vol. 20, No. 20, Oct. 15, 2008, pp. 1739-1741.

Submicrosecond Submilliwatt Silicon-on-Insulator Thermooptic Switch, M.W. Geis, S.J. Spector, R.C. Williamson and T.M. Lyszczarz, IEEE Photonics Technology Letters, vol. 16, No. 11, Nov. 2004, pp. 2514-2516.

Waveguide-Integrated, Ultralow-Energy GeSi Electro-Absorption Modulators, Jifeng Liu, Mark Beals, Andrew Pomerene, Sarah Bernardis, Rong Sun, Jing Cheng, Lionel C. Kimerling and Jurgen Michel, Letters, Nature Photonics, vol. 2, Jul. 2008, www.nature.com/naturephotonics, pp. 433-437.

Optical Transmission Losses in Polycrystalline Silicon Strip Waveguides: Effects of Waveguide Dimensions, Thermal Treatment, Hydrogen Passivation, and Wavelength, Journal of Electronic Materials, vol. 29, No. 12, 2000, pp. 1380-1386.

Progress in Optical Devices and Materials, Proceedings 2007, Annual Workshop of the IEEE/LEOS Benelux Chapter, May 25, 2007, Cobra Institute, Eindhoven University of Technology, The Netherlands, B. HuisZoon, P.J. Urban, C. Caucheteur, 33 pgs.

Low Loss (~6.45dB/cm) Sub-Micron Polycrystalline Silicon Waveguide Integrated with Efficient SiON Waveguide Coupler, Q. Fang, J.F. Song, S.H. Tao, M.B. Yu, G. Q. Lo and D. L. Kwong, Apr. 28, 2008, vol. 16, No. 9, Optics Express, pp. 6425-6432.

Polysilicon Photonic Resonators for Large-Scale 3D Integration of Optical Networks, Kyle Preston, Bradley Schmidt and Michal Lipson, Dec. 10, 2007, Vo. 15, No. 25, Optics Express, pp. 17283-17290.

High-Speed All-Optical Modulation Using Polycrystalline Silicon Microring Resonators, Kyle Preston, Po Dong, Bradley Schmidt and Michal Lipson, Applied Physics Letters 92, 151104 (2008), pp. 151104-1-151104-3.

Lateral Polysilicon P-N Diodes, M. Dutoit and F. Sollberger, J. Electrochme. Soc.: Solid-State Science and Technology, vol. 125, No. 10, pp. 1648-1651, 1978.

Lateral Polysilicon P+-P-N+ and P+-N-N= Diodes, Sooraj V. Karnik, Miltiadis K. Hatalis, Solid-State Electronics 47 (2003) pp. 653-659, Pergamon, Available online at www.sciencedirect.com.

Electrooptical Effects in Silicon, Richard A. Soref and Brian R. Bennett, IEEE Journal of Quantum Electronics, vol. QE-23, No. 1, Jan. 1987, pp. 123-129.

(56) References Cited

OTHER PUBLICATIONS

Grain Boundaries in Semiconductors, C R M Grovenor, IOP Science, 1985 J. Phys. C: Solid State Phys. 18 4079 (http://iopscience.iop.org/022-3719/18/21/008), pp. 4079-4087.

PINIP Based High-Speed High-Extinction Ratio Micron-Size Silicon Electro-Optic Modulator, Sasikanth Manipatruni, Qianfan Xu, Michal Lipson, Oct. 1, 2007, vol. 15, No. 20, Optics Express, pp. 13035-13042.

12.5 Gbit/s Carrier-Injection-Based Silicon Micro-Ring Silicon Modulators, Qianfan Xu, Sasikanth Manipatruni, Brad Schmidt, Jagat Shakya, and Michal Lipson, Jan. 22, 2007, Vo. 15, No. 2, Optics Express, pp. 430-436.

Silicon Microring Resonators with 1.5-μm Radius, Qianfan Xu, David Fattal and Raymond G. Beausoleil, Mar. 17, 2008, vol. 16, No. 6, Optics Express, pp. 4309-4315.

Photonic-Bandgap Microcavities in Optical Waveguides, J.S. Foresi, P.R. Villeneuve, J. Ferrera, E.R. Thoen, G. Steimeyer, S. Fan, J.D. Joannopoulos, L.C. Kimerling, Henry I. Smith and E.P. Ippen, Letters to Nature, Nature, vol. 390, Nov. 13, 1997, pp. 143-145.

Compact Electro-Optic Modulator on Silicon-On-Insulator Substrates Using Cavities with Ultra-Small Modal Volumes, Bradley Schmidt, Qianfan Xu, Jagat Shakya, Sasikanth Manipatruni and Michal Lipson, Mar. 19, 2007, vol. 15, No. 6, Optics Express, pp. 3140-3148.

* cited by examiner

SEMICONDUCTOR HIGH-SPEED INTEGRATED ELECTRO-OPTIC DEVICES AND METHODS

STATEMENT REGARDING FEDERALLY FUNDED RESEARCH OR DEVELOPMENT

This invention was made with U.S. government support under grant number ECS-0335765 awarded by the United States National Science Foundation (NSF). The United States Government has certain rights in the invention.

CROSS-REFERENCE TO RELATED APPLICATION

This application claims priority to the prior-filed provisional patent application with Ser. No. 61/314,466, entitled "Silicon high-speed integrated electro-optic devices and methods", filed Mar. 16, 2010, the entirety of which is incorporated by reference herein.

FIELD

The invention relates to electro-optic devices in general and more particularly to deposited semiconductor electro-optical devices.

BACKGROUND

Photonic networks on a silicon microelectronic chip offer the opportunity to overcome the power and bandwidth limitations in traditional microprocessor interconnects. One device for on-chip optical networks is a high-speed silicon electro-optic modulator.

All previous examples of silicon micrometer-scale modulators have been fabricated on single-crystalline silicon-on-insulator (SOI) wafers. The basic device structure is an optical resonator embedded in a diode. The diode is used to inject and extract charge from the resonator, which switches the light transmission on and off using the free carrier plasma dispersion effect.

Reliance on the SOI platform presents two difficult challenges for the integration of optics with microprocessor ships. First, crystalline SOI is the same material that electrical transistors are made from, and the large-scale integration of hundreds of optical devices required for an optical network would take a prohibitive amount of real estate away from transistors in the same silicon layer. Second, the buried oxide thickness in standard microelectronic SOI is much smaller than the optical wavelength and, therefore, not appropriate for a waveguide cladding.

The discussion above is merely provided for general background information and is not intended to be used as an aid in determining the scope of the claimed subject matter.

SUMMARY

Novel integrated high-speed electro-optic structures and methods for fabrication of the same are disclosed in a variety of embodiments. In an illustrative embodiment, a device includes a substrate, a first waveguide comprising polycrystalline silicon positioned on the substrate, and a first optical resonator comprising polycrystalline silicon positioned on the substrate. First and second doped semiconducting regions comprising polycrystalline silicon are positioned proximate to the first optical resonator. The first optical resonator is communicatively coupled to the first waveguide.

In another illustrative embodiment, a method includes providing an insulating base layer; forming an amorphous semiconductor layer on the base layer; and modifying at least a portion of the amorphous semiconductor layer into a polycrystalline semiconductor layer. The method further includes background doping a target area of the polycrystalline semiconductor layer; forming a waveguide and a resonator in the polycrystalline semiconductor layer, comprising at least one step of lithography and/or etching, wherein the resonator is formed in the background doped target area; forming a p-type region in the polycrystalline semiconductor layer proximate to the resonator, comprising at least one step of applying a p-type dopant; and forming an n-type region in the polycrystalline semiconductor layer proximate to the resonator, comprising at least one step of applying an n-type dopant.

This Summary is intended only to provide a brief overview of subject matter disclosed herein according to one or more illustrative embodiments, and does not serve as a guide to interpreting the claims or to define or limit the scope of the invention, which is defined only by the appended claims. This Summary is provided to introduce an illustrative selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

For a further understanding of the objects of the various illustrative embodiments, reference will be made to the following detailed description which is to be read in connection with the accompanying drawings.

The drawings are not necessarily to scale, emphasis instead generally being placed upon illustrating the principles of various embodiments. In the drawings, like numerals are used to indicate like parts throughout the various views.

DETAILED DESCRIPTION OF ILLUSTRATIVE EMBODIMENTS

Figure 1A:
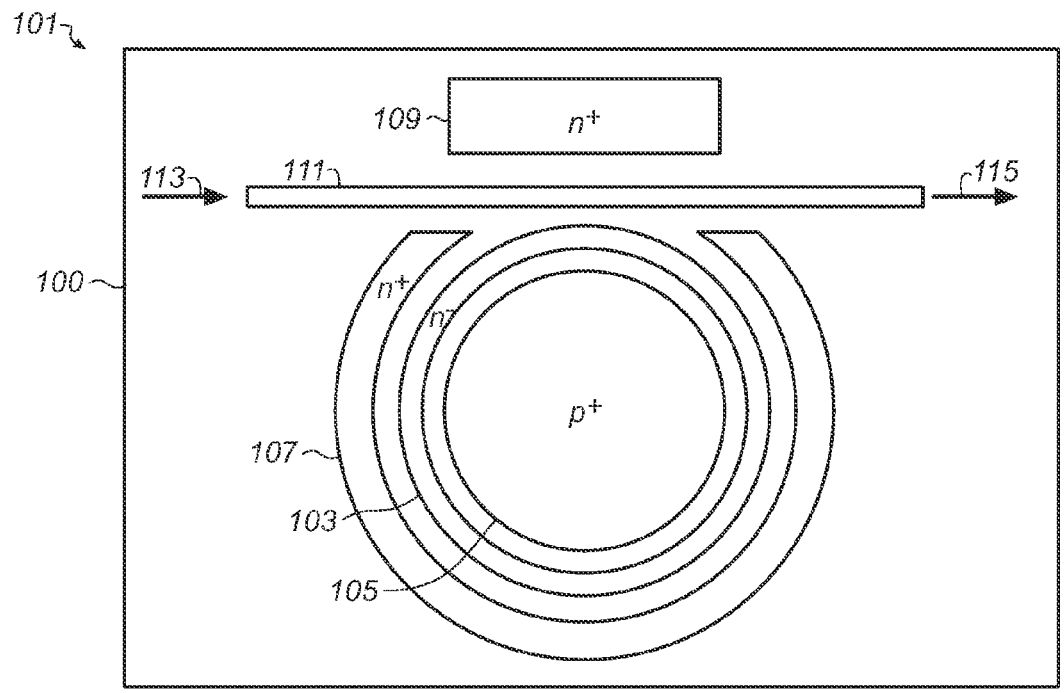
FIG. 1a depicts a top plan schematic view of an electro-optic modulator, in accordance with an illustrative embodiment.

Set forth herein are novel integrated electro-optic devices such as electro-optic modulators and novel methods for fabricating integrated electro-optic structures, in accordance with a variety of embodiments. FIG. 1a depicts a top plan schematic view of an electro-optic modulator 101, as an example of one type of electro-optic device of the present disclosure. Electro-optic modulator 101 includes a substrate 100 that may be formed of a deposited microelectronic material, such as polycrystalline silicon (i.e. polysilicon), for example. In other implementations, substrate 100 may be formed from at least one of another form of silicon, germanium, or a compound semiconductor such as gallium arsenide or indium phosphide, for example. Electro-optic modulator 101 further includes a first optical resonator 103, a p-type doped semiconducting region 105, n-type doped semiconducting regions 107 and 109, and a first waveguide 111, positioned on the substrate 100. The optical resonator 103 is positioned relative to the waveguide 111 such as to enable optical coupling between the optical resonator 103 and the waveguide 111. Optical resonator 103 is thereby communicatively coupled to the waveguide 111, so that electrical signals provided to at least one of the doped semiconducting regions 105, 107, 109 can control the resonant wavelength of optical resonator 103, and thereby control the transmission of an optical signal, depicted here as input signal 115 and output signal 117, along waveguide 111.

First optical resonator 103 is a ring resonator in this example. Other optical resonators such as a microdisk or a photonic crystal may be used in various implementations. The p-type doped semiconducting region 105 and the n-type doped semiconducting regions 107, 109 are positioned proximate to the optical resonator 103, in this example. In particular, the p-type doped semiconducting region 105 is positioned interior to the optical resonator 103, and the n-type doped semiconducting regions 107, 109 and the waveguide 111 are positioned exterior to the optical resonator 103, in this example. The p-type doped semiconducting region 105 and the n-type doped semiconducting regions 107, 109 are positioned proximate to the first optical resonator 103 to function as $p^+$ and $n^+$ regions of a $p^+n^-n^+$ diode with optical resonator 103.

Waveguide 111 may be configured for transmission of optical signals, and may be formed with dimensions optimized for transmission on a particular wavelength or spectrum of wavelengths depending on materials, operating conditions, and other relevant factors. In various examples, waveguide 111 may be suited for transmission of ultraviolet, visible or infrared wavelengths, and waveguide 111 may have a cross-sectional dimension within a range of 100 to 2,000 nanometers, for example.

Other physical arrangements and layouts of the various components may be used in other implementations, such as an n-type doped semiconducting region interior to a ring resonator and a p-type doped semiconducting region exterior to a ring resonator, or layouts that extend into multiple vertical layers, for example. The optical resonator 103 is communicatively coupled to the waveguide 111, in the example of FIG. 1a. That is, optical resonator 103 is optically coupled to the waveguide 111, to allow signal communication between optical resonator 103 and waveguide 111. Waveguide 111 may be formed at least mostly from polycrystalline silicon, or another material such as silicon nitride or hydrogenated amorphous silicon, for example. Using these materials for forming the waveguides may assist in integrating an electro-optic device layer on top of another semiconductor layer such as a CMOS metal interconnect layer, and support feasibly integrating electro-optic functionality with other semiconductor and microelectronic fabrication, for example.

The p-type doped semiconducting region 105 may be considered to be a first doped semiconducting region, and the n-type doped semiconducting regions 107 and 109 may be considered to be second doped semiconducting regions, such that in other embodiments, one or more first doped semiconducting regions and one or more second doped semiconducting regions may be positioned proximate to the first optical resonator 103 in any functional arrangement. The first optical resonator 103 may also be doped with a background doping, which is an n-type background doping in this example but may be a p-type background doping in other embodiments. The p-type doped semiconducting region 105, the first optical resonator 103, and the n-type doped semiconducting regions 107 and 109 thereby form a $p^+n^-n^+$ diode.

In an illustrative example, the substrate 100 may be formed of polycrystalline silicon, and various features may be formed from the same layer of polycrystalline silicon, using various techniques of deposition, etching, doping, annealing, and so forth. In this example, in electro-optic modulator 101, waveguide 111 may be formed from or include polycrystalline silicon, the first optical resonator 103 may be formed from or include polycrystalline silicon background doped with a background donor dopant, the p-type doped semiconducting region may be formed from or include polycrystalline silicon doped with an acceptor dopant, and the n-type doped semiconducting region may be formed from or include polycrystalline silicon doped with a donor dopant. The p-type and n-type doped semiconducting regions may be formed from or include polycrystalline silicon doped with acceptor and donor dopants, respectively, at a higher density than the background donor dopant in the first optical resonator 103.

For example, the background doping in the region of the first optical resonator 103 may have a concentration in a range of between $10^{11}$ and $10^{18}$ charge carriers per square centimeter, and the p-type semiconducting region and the n-type semiconducting region may be doped with a concentration in a range of between $10^{14}$ and $10^{22}$ charge carriers per square centimeter, in various illustrative implementations. The p-type semiconducting region may include silicon doped with any type of acceptor dopant, such as one or more of boron, aluminum, or gallium, for example. The n-type semiconducting region may include silicon doped with any type of donor dopant, such as one or more of phosphorus, arsenic, or antimony, for example. The acceptor and donor dopants may be applied in an ionic form such as boron difluoride ion and phosphorus ion, for example. The acceptor and donor dopants may be applied using plasma enhanced chemical vapor deposition (PECVD), for example.

Figure 1B:
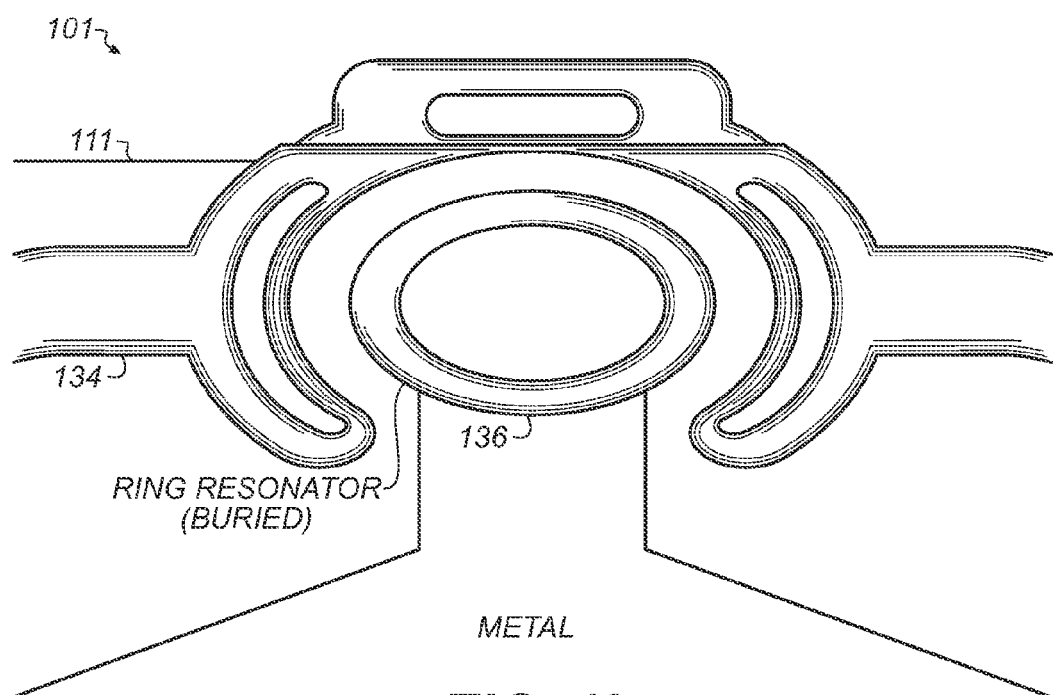
FIG. 1b depicts a perspective view based on a scanning electron microscope (SEM) image of an electro-optic modulator, in accordance with an illustrative embodiment.

The electro-optic modulator 101 may be coated with an insulating cladding layer such as silicon dioxide, with electrical contacts made through the cladding to the diode elements such as p-type doped semiconducting region 105 and n-type doped semiconducting regions 107, 109, in an illustrative embodiment. FIG. 1b depicts a perspective view based on a scanning electron microscope (SEM) image of the electro-optic modulator 101, in accordance with an illustrative embodiment consistent with that of FIG. 1a, with a cladding 110 covering the substrate 100 and various elements formed thereon, including first optical resonator 103, doped semiconducting regions 105, 107, and 109, and waveguide 111. FIG. 1B also shows first optical resonator 103 and waveguide 111 covered with cladding 110.

Figure 1C:
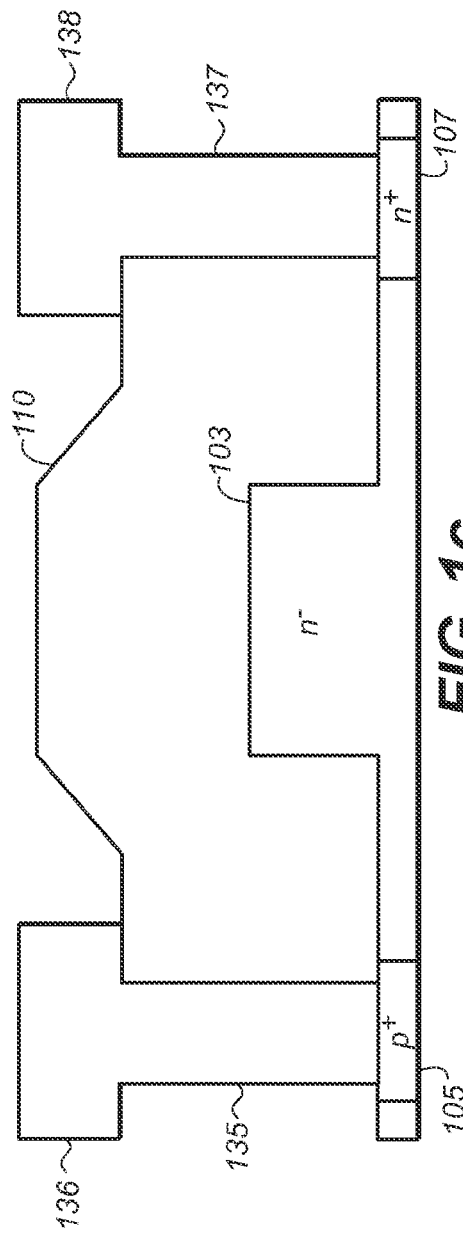
FIG. 1c depicts a cross-section side plan schematic view of a section of an electro-optic modulator, in accordance with an illustrative embodiment.

A first conductive contact, which includes via 135 and surface contact pad 136, is connected to the p-type doped semiconducting region 105. A second conductive contact, which includes via 137 and surface contact pad 138, is connected to the n-type doped semiconducting regions 107 and 109. Vias 135, 137 extend through the cladding 110 between the surface portions and the doped semiconducting regions 105, 107, and 109, as is shown in FIG. 1c. FIG. 1c depicts a cross-section side plan schematic view of a section of electro-optic modulator 101, as another view of the illustrative embodiment of FIGS. 1a and 1b. A via 135 extends through the cladding 110 from p-type doped semiconducting region 105 to a contact pad 136, and another via 137 extends through the cladding 110 from n-type doped semiconducting regions 107, 109 to a contact pad 138. Contact pads 136, 138 may connect with conductive leads 132, 134 respectively that extend away from electro-optic modulator 101, as shown in FIG. 1B, to be available for connection with a larger circuitry infrastructure. For example, a metal interconnect layer (not shown) may be connected to the conductive contacts including surface contact pads 136, 138.

The electro-optic modulator 101 may function as an electrically controlled modulator. The electro-optic modulator 101 may include a tuning mechanism based on any of an electrical charge carrier, thermal, magnetic, photoelectric or microfluidic effect, or at least one of the above. For example, an electrical signal, in terms of a controllable signal such as voltage or current, for example, may be applied to electro-optic modulator 101, such as through the conductive leads 132, 134, which may shift the index of refraction and therefore the resonant wavelength of optical resonator 103, and thereby control the transmission of an optical signal along waveguide 111. This enables electro-optic modulator 101 to function as a modulator to enable electrical signals applied through conductive leads 132, 134 to be translated to an optical signal along waveguide 111. This effect can also be used to calibrate a resonator to correct for variations or defects resulting from manufacturing processes, for example.

Figure 1D:
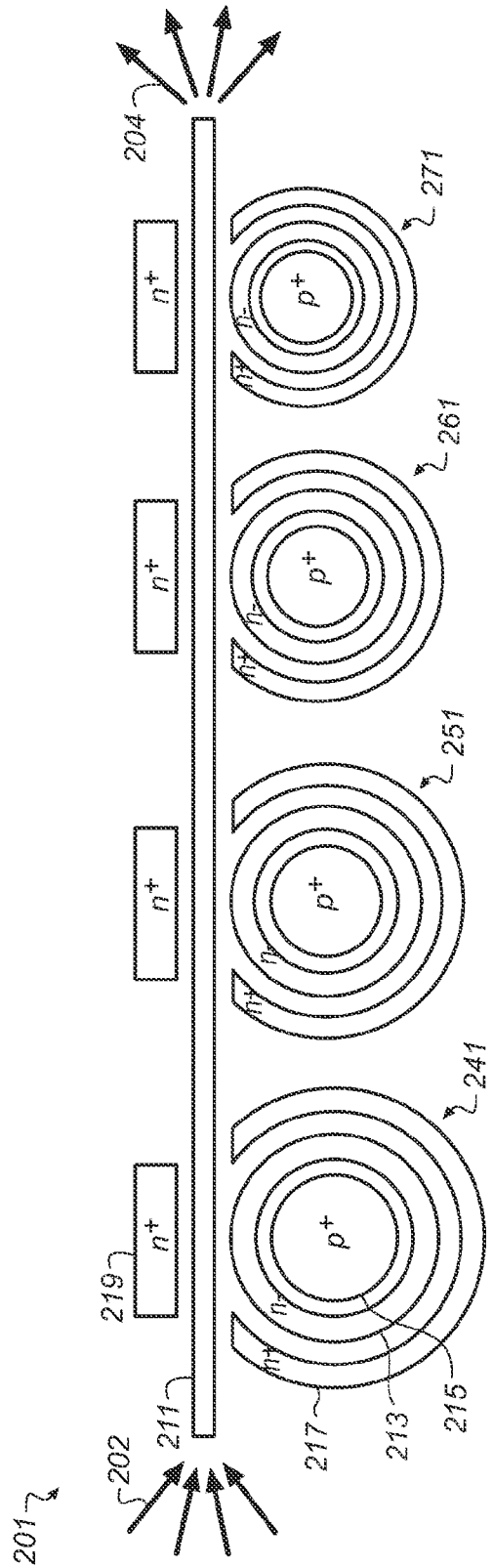
FIG. 1d depicts a top plan schematic view of a multiple-resonator electro-optic modulator, in accordance with an illustrative embodiment.

FIG. 1d depicts a top plan schematic view of a multiple-resonator electro-optic modulator, in accordance with an illustrative embodiment in which an array 201 of four optical resonators 241, 251, 261, and 271, in the form of microring resonators, are optically coupled to a single waveguide 211. Representative optical resonator 241 includes an optical resonator 213 that is communicatively coupled to waveguide 211, and p-type doped semiconducting region 205 and n-type doped semiconducting regions 207 and 209 proximate to optical resonator 213 thereby forming a p$^+$n$^-$n$^+$ diode with optical resonator 213. Each of the optical resonators 241, 251, 261, and 271 in the array may therefore function as an independent modulator on waveguide 211. The four optical resonators 241, 251, 261, and 271 have different radii, which enables each one to operate at a different frequency, and enables the array of resonators to engage in multiplexing data in multiple wavelengths with the waveguide 211. Input data signals 202 along waveguide 211 may include wavelength-multiplexed data, and may be modulated by representative optical resonators 241, 251, 261, 271, and any other communicatively coupled elements to perform logic operations on different wavelength signals that determine the output wavelength-multiplexed data signals 204. The differences in radii of the resonators is exaggerated in the view of FIG. 1d. The four resonators as depicted are merely illustrative of what could be tens, hundreds, thousands, or any number of different resonators optically coupled to single waveguide 211. Multiple resonators may also be optically coupled to additional waveguides on a single opto-electronic substrate or chip, for example.

In an array such as array 201 shown in FIG. 1d, each of the optical resonators may be positioned at a distance from the waveguide to enable optical coupling of each particular optical resonator, with its own radius, to the waveguide, taking into account the dimensions, materials, and other relevant factors that affect optical coupling. The optical resonators may also be positioned relative to each other to prevent optical coupling between adjacent resonators, with enough spacing between the adjacent resonators, dependent on other factors such as materials and shielding between the resonators and the operating wavelengths of the resonators. For example, each resonator may be positioned somewhere in a range of 100 to 1,000 nanometers from the waveguide, while adjacent resonators may be positioned at least a couple of thousand nanometers away from each other, taking into account the materials, resonant wavelengths, and other relevant factors in a particular implementation.

In another example, an array may have multiple optical resonators of the same radius, and the array may also include tuning mechanisms associated with some or all of the optical resonators that enable the optical resonators to be in communication with the waveguide at different times, thereby enabling time multiplexing in the waveguide. Other implementations may use other photonic structures for multiplexing data in wavelength or time or in other controllable signal variables such as phase or amplitude, for example. Still other implementations may enable a combination of different multiplexing techniques. For example, an opto-electronic chip may have a set of different arrays with several microring resonators at a first radius, several other microring resonators at a second radius, and so forth all coupled to a single waveguide and controlled to multiplex in both wavelength and time along the single waveguide, for example.

In another example, an optical resonator may be positioned vertically proximate to the waveguide on different deposited layers of the substrate from each other, such that they are deposited or formed in separate fabrication steps, as opposed to being positioned horizontally proximate to each other as depicted in FIGS. 1a, 1b, and 1d. One or more optical resonators may be optically coupled to the waveguide across a separation defined between different vertically stacked layers, so that a resonator may be stacked above or below the waveguide. This may be combined with formation in the same layer with horizontal separation, so that different resonators may be positioned below, sideways from, and above a common waveguide, for example. Vertically stacked resonators and waveguides may also be formed to optimize the distance between the two for optical coupling, with positioning displacements generally in the range of 100 to 1,000 nanometers, depending on materials, wavelengths, and other relevant factors.

Vertical arrangements may also be repeated, so that there may be any number of multiple layers of stacked resonators and waveguides, combined with electrical connections such as electrical leads, vias, and interconnects, to provide the basis for a broad variety of three-dimensionally arranged, interconnected, and interacting electrical and optical elements in a single integrated electro-optic chip created with well-understood fabrication techniques for feasible scaling.

Figure 4:
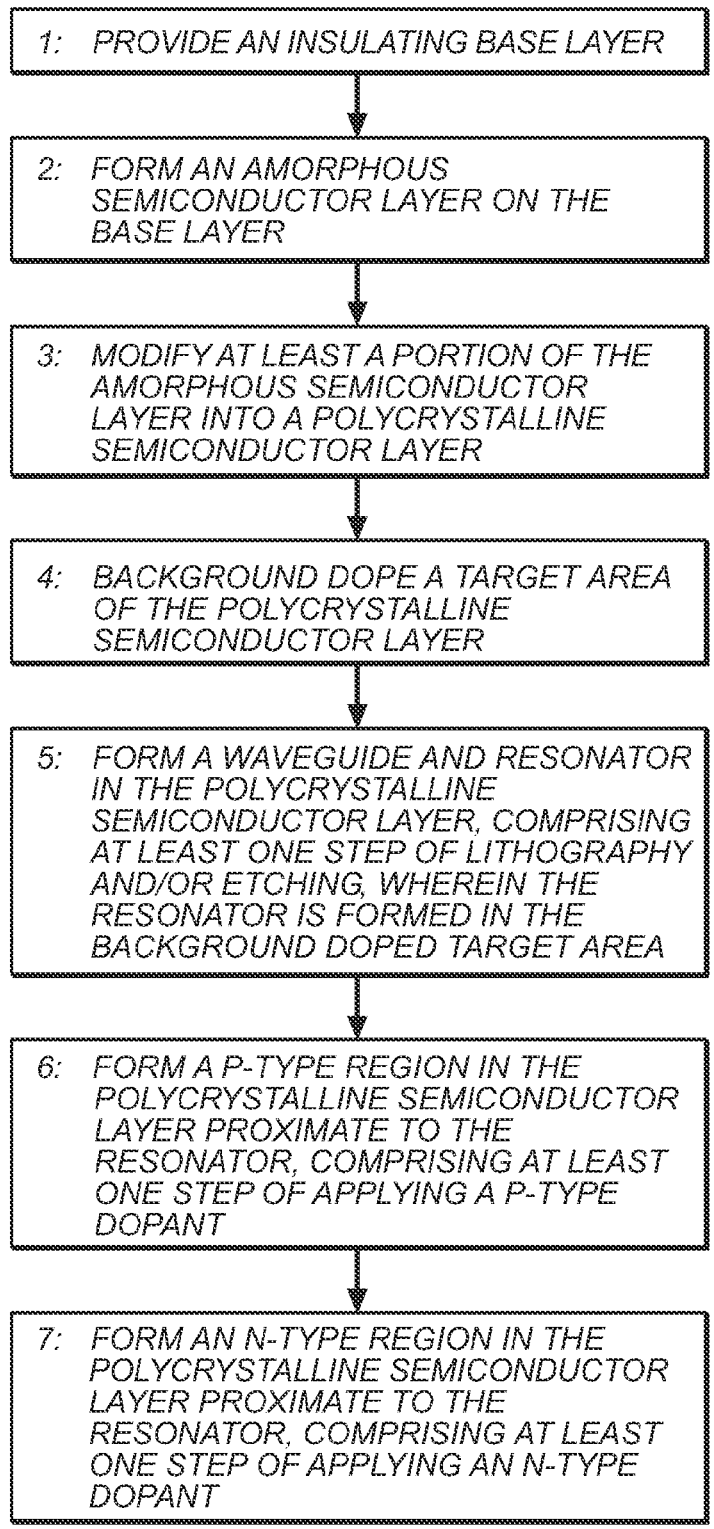
FIG. 4 depicts a series of fabrication steps for a method for fabricating an electro-optic device, in accordance with an illustrative embodiment.

FIG. 4 depicts a flowchart for a method 400 according to an illustrative embodiment. Method 400 includes step 1, of providing an insulating base layer; step 2, of forming an amorphous semiconductor layer on the base layer; step 3, of modifying at least a portion of the amorphous semiconductor layer into a polycrystalline semiconductor layer; step 4, of background doping a target area of the polycrystalline semiconductor layer; step 5, of forming a waveguide and a resonator in the polycrystalline semiconductor layer, comprising at least one step of lithography and/or etching, wherein the resonator is formed in the background doped target area; step 6, of forming a p-type region in the polycrystalline semiconductor layer proximate to the resonator, comprising at least one step of applying a p-type dopant; and step 7, of forming an n-type region in the polycrystalline semiconductor layer proximate to the resonator, comprising at least one step of applying an n-type dopant. The order of these steps may be different, and other steps may also be used together with the steps listed here, in various embodiments.

Step 1 of providing an insulating base layer may involve providing a semiconductor substrate, such as forming a silicon dioxide layer or other type of oxide layer on a silicon wafer, as an illustrative example. This insulating layer may be hundreds of nanometers to one or more microns thick, and may be three microns thick in one illustrative example. Step 2, of forming an amorphous semiconductor layer on the base layer, may involve depositing amorphous silicon on the base layer, using low pressure chemical vapor deposition (LPCVD), plasma enhanced chemical vapor deposition (PECVD), e-beam evaporation, sputtering, or some other deposition technique, for example. The amorphous semiconductor layer may be formed with a thickness within a range of 100 to 500 nanometers, or around one micron, or around three microns, or with other thicknesses smaller or greater than these ranges, in various implementations.

Step 3, of modifying at least a portion of the amorphous semiconductor layer into a polycrystalline semiconductor layer, may involve performing a thermal annealing of the amorphous silicon, thereby crystallizing part or all of the amorphous silicon into polycrystalline silicon, in an illustrative example. This annealing process may involve baking the wafer, such as at a maximum temperature of 1,100 degrees Celsius in an illustrative example. In another example, this annealing process may involve applying a laser with a wavelength of less than or equal to 400 nanometers and a pulse period of less than or equal to 200 nanoseconds to the amorphous semiconductor layer to crystallize it into a polycrystalline semiconductor layer. Such a process of laser annealing using submicrosecond pulses may enable proper annealing of the layer of interest itself, i.e. the layer being crystallized in this step, without applying excessive heat to adjacent layers. This may be useful when this annealing step is part of fabricating a semiconductor electro-optic layer on top of one or more other electronic or electro-optic layers being formed in a multi-layer or otherwise three-dimensional chip. This is one example of enabling fabrication of at least one electro-optic layer adjacent to at least one electronic integrated circuit layer in a single fabrication process on a single wafer.

Step 4, of background doping a target area of the polycrystalline semiconductor layer, may involve opening windows in positive e-beam resist and performing ion implantation with a Group V dopant such as phosphorus, for example. In one illustrative example, phosphorus ions may be implanted with a dose of $4.7 \times 10^{12}$ cm$^{-2}$ or in a comparable range and with an energy of 130 keV or in a comparable range.

Step 5, of forming a waveguide and a resonator in the polycrystalline semiconductor layer, may include at least one step of lithography and/or etching, which may include e-beam lithography or photolithography and a resist such as XR-1541 resist, and transferring the pattern using an etching process such as chlorine-based inductively coupled plasma reactive ion etching (ICP-RIE). Other etchants may also be used such as hydrogen bromide (HBr), sulfur hexafluoride ($SF_6$), or octafluorocyclobutane ($C_4F_8$), for example. This may include forming the resonator in the background doped target area. Forming the resonator may also involve leaving or etching one or more slabs of silicon, with a thickness in the range of 40 nanometers, or within a range of 25 to 75 nanometers, for example, which may provide electrical access, and which may define an exterior of the resonator.

Step 6, of forming a p-type region in the polycrystalline semiconductor layer proximate to the resonator, may include at least one step of applying a p-type dopant such as boron, aluminum, or gallium, for example, and which may be done by ion implantation, for example. In one illustrative example, boron difluoride ($BF_2$) ion implantation may be performed in a dose in the range of $1.2 \times 10^{15}$ cm$^{-2}$, for example. Step 7, of forming an n-type region in the polycrystalline semiconductor layer proximate to the resonator, may include at least one step of applying an n-type dopant such as phosphorus, arsenic, or antimony, for example, and which may be done by ion implantation, for example. In one illustrative example, phosphorus ion implantation may be performed, also in a dose in the range of $1.2 \times 10^{15}$ cm$^{-2}$, for example.

Various embodiments of method 400 may also include one or more steps of annealing the polycrystalline semiconductor layer after forming the waveguide, the resonator, the p-type region, and the n-type region in the polycrystalline semiconductor layer. In some implementations, this step of annealing the polycrystalline semiconductor layer may involve baking the polycrystalline semiconductor layer for two or more periods at temperatures within a range of 600 to 1,050 degrees Celsius, for example. In other implementations, this step of annealing the polycrystalline semiconductor layer may involve short-period laser annealing, such as with an excimer or other high-frequency laser with pulse periods in the hundreds of nanoseconds, for example.

Various embodiments of method 400 may also include providing an insulating cladding on the polycrystalline semiconductor layer, forming vias in contact with the p-type region and the n-type region through the insulating cladding, and forming conductive contacts on surfaces of the vias, as described with reference to FIGS. 1b and 1c above, for example.

Figure 5:
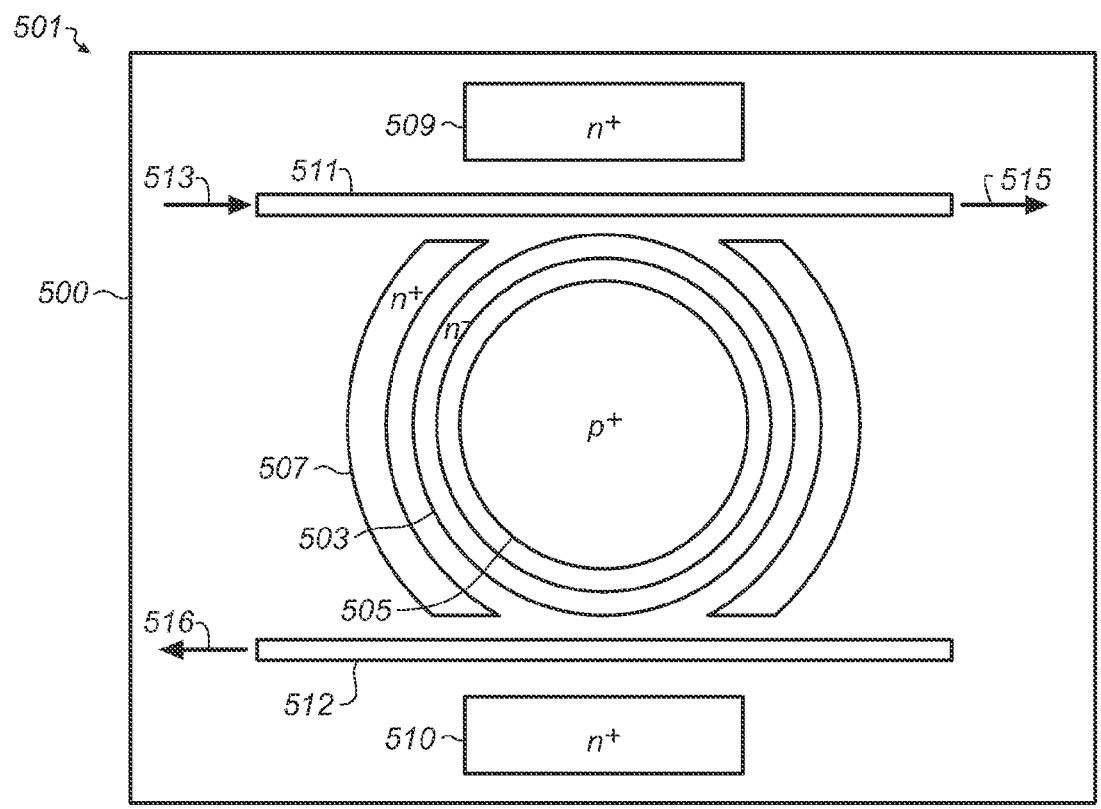
FIG. 5 depicts a top plan schematic view of an electro-optic switch, in accordance with an illustrative embodiment.

FIG. 5 depicts a top plan schematic view of an electro-optic switch 501, as another example of a type of electro-optic device of the present disclosure. Electro-optic switch 501 is analogous in some respects to electro-optic modulator 101 of FIG. 1a, in that it includes an optical resonator 503 formed as part of a p$^+$n$^-$n$^+$ diode, between p-type doped semiconducting region 505 and n-type doped semiconducting regions 507, 509, and 510. Optical resonator 503 is also communicatively coupled to a first waveguide 511, and also to a second waveguide 512. Electro-optic switch 501 can thereby allow input optical signals 513 on waveguide 511 to continue transmitting as output optical signals 515 along waveguide 511, or can translate optical input signals 513 on waveguide 511 into new optical signals 516 transmitting on waveguide 512.

In particular, electro-optic switch 501 can be controlled through electrical signals through contacts with one or more of the doped semiconducting regions 505, 507, 509, and 510 to adjust the internal index of refraction and therefore the resonant wavelength of optical resonator 503. In an off state of electro-optic switch 501, the resonant wavelength of optical resonator 503 is kept different from the wavelength of the input signals 513, which allows transmission of input signals 513 along the first waveguide 511 as output signals 515. Electro-optic switch 501 may also be set into an on state, in which the resonant wavelength of optical resonator 503 is tuned to the same wavelength of the input signals 513, which allows translation of input signals 513 from the first waveguide 511 to the second waveguide 512 as output signals 516.

Multiple electro-optic modulators and switches may be provided in any of a wide variety of arrangements, including multiple electro-optic modulators and/or switches optically coupled to any number of waveguides, and with modulators or switches optically coupled to waveguides laterally within the same electro-optic layer or vertically across adjacent electro-optic layers. For example, an electro-optic switch otherwise similar to electro-optic switch 501 of FIG. 5 may be optically coupled to one or more waveguides that are positioned above or below the electro-optic switch in a different electro-optic device layer, formed in a separate series of fabrication steps. Analogous switching mechanisms may also be used in other implementations that modulate or switch data in time, phase, or amplitude, for example.

Figure 2A:
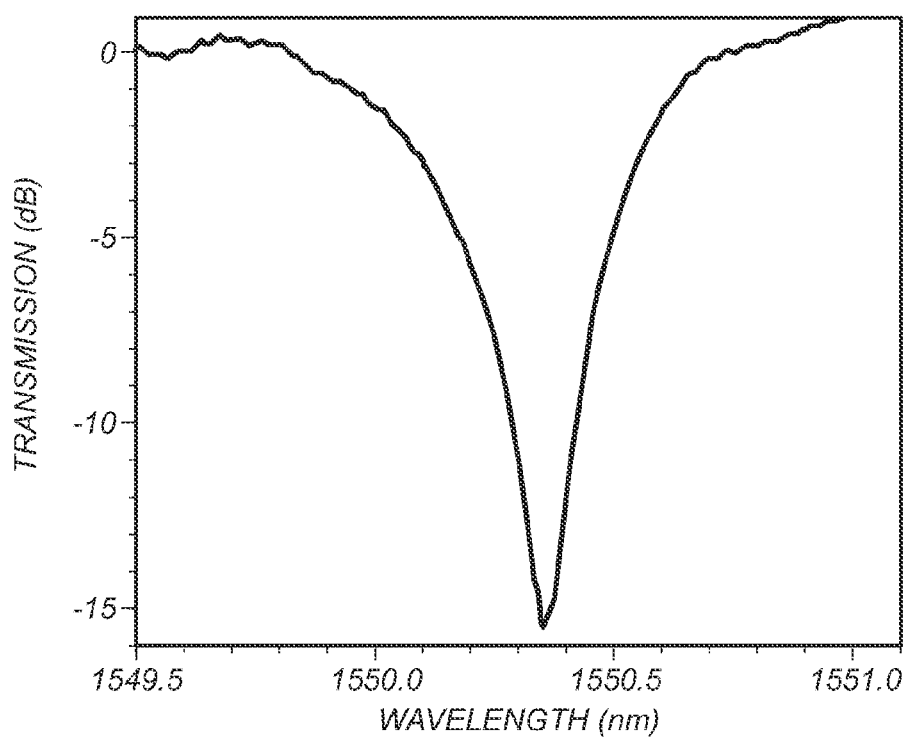
FIG. 2a depicts a graph of optical transmission per wavelength through an electro-optic modulator in accordance with an illustrative embodiment.
Figure 2B:
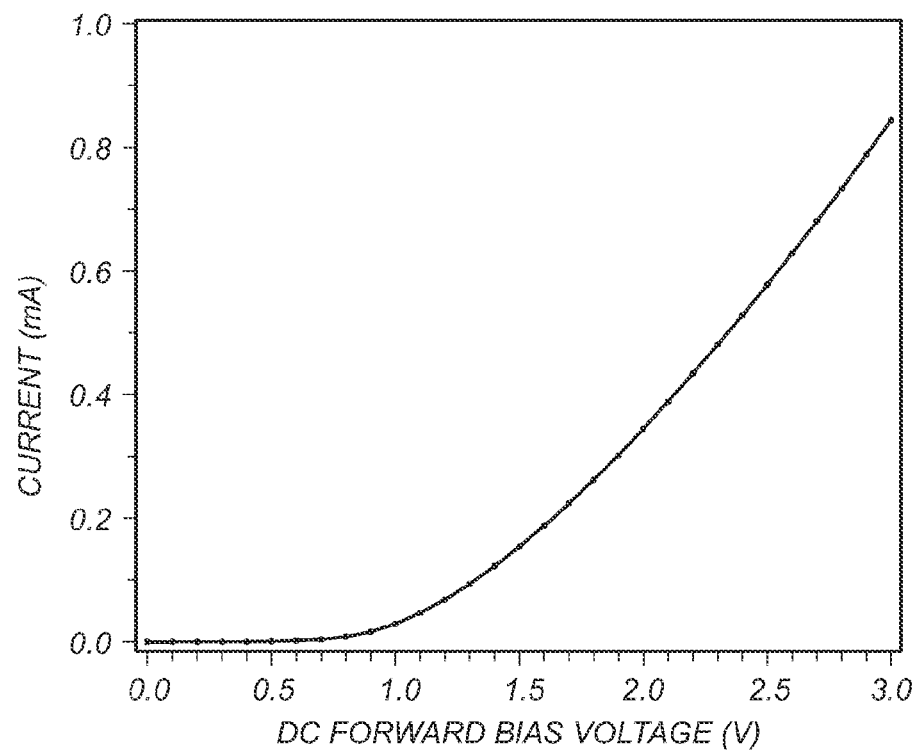
FIG. 2b depicts a graph of current per bias voltage through an electro-optic modulator in accordance with an illustrative embodiment.
Figure 3A:
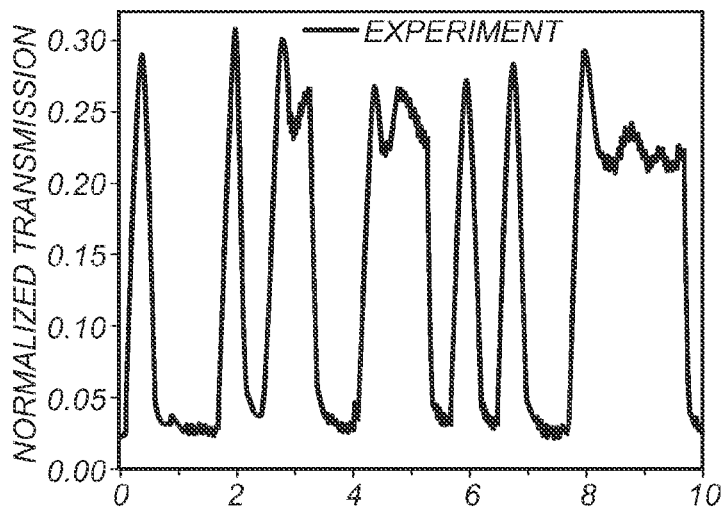
FIG. 3a depicts a graph of experimentally measured optical signal transmission through an electro-optic modulator in response to a voltage signal in accordance with an illustrative embodiment.
Figure 3B:
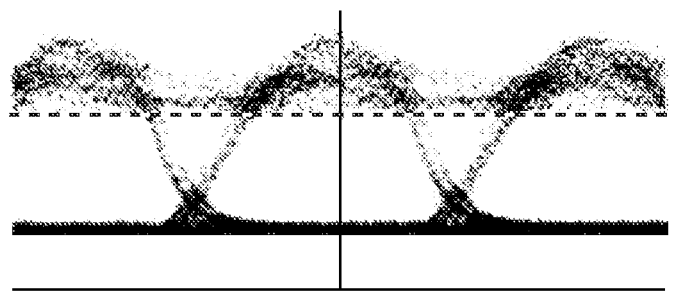
FIG. 3b depicts a graph of a frame-averaged optical eye diagram for an experimentally measured optical signal transmission through an electro-optic modulator in response to a voltage signal in accordance with an illustrative embodiment.
Figure 3C:
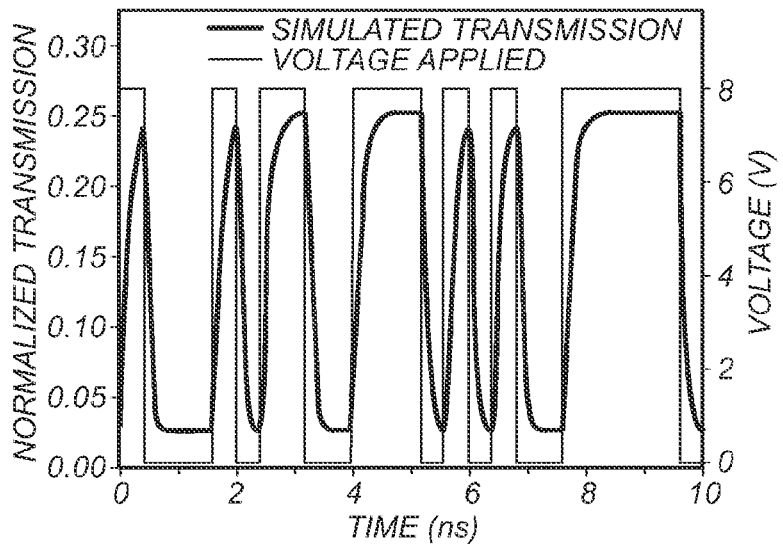
FIG. 3c depicts a graph of simulated optical transmission through an electro-optic modulator in response to a voltage signal in accordance with an illustrative embodiment.

Additional illustrative examples of devices and methods within the scope of this disclosure are provided below with reference to the corresponding provisional patent application. The devices and methods within the disclosure below are all illustrative examples and do not serve to limit the scope or exclude other implementations within the complete scope of the appended claims. FIGS. 1a, 1b, and 1c are referenced below as FIGS. 1 . . . (a), (b), and (c); FIGS. 2a and 2b are referenced below as FIGS. 2 (a) and (b); and FIGS. 3a, 3b, and 3c are referenced below as FIGS. 3 . . . (a) . . . (b) . . . and (c).

Appendix: Illustrative Examples from Provisional Application

There is set forth herein embodiments of methods and devices capable of GHz-speed electro-optic modulation (e.g., in a deposited microelectronic film). The use of deposited material, here polycrystalline silicon (polysilicon), would enable the monolithic integration of optics in a separate layer of a microprocessor chip and provide the flexibility needed for optical system design. Exemplary electro-optic functionality is demonstrated by embedding a $p^+n^-n^+$ diode around a polysilicon ring resonator. In order to achieve good optical and electrical properties, we use photonic structures with cross-sectional dimensions of hundreds of nanometers, approximately the same dimensions as the material grain size. This can enable sub-nanosecond carrier injection and optical modulation using the free carrier dispersion effect.

According to one aspect of the application, there is provided an electro-optic device such as a high speed micrometer-scale electro-optic modulator based on the enhancement of silicon's free carrier dispersion effect by a ring resonant structure.

According to one aspect of the application, there is provided an electro-optic device such as modulator fabricated in a deposited thin film of polycrystalline silicon. The thin film can be deposited by low pressure chemical vapor deposition (LPCVD), plasma enhanced chemical vapor deposition (PECVD), e-beam evaporation, or sputtering, all of which are standard silicon CMOS fabrication techniques. The thin film can be deposited in either the amorphous phase or the polycrystalline phase. The thin film can be annealed to improve its optical and electrical properties by furnace thermal annealing, rapid thermal annealing, or excimer laser annealing. The thin film can be protected by a silicon dioxide or silicon nitride layer during an anneal. The thin film may be chemical-mechanical polished (CMP) after annealing to decrease top surface roughness.

According to one aspect of the application, there is provided an electro-optic device such as a modulator that can be either laterally coupled or vertically coupled to a bus waveguide. The bus waveguide can be fabricated from crystalline silicon, polycrystalline silicon, amorphous silicon, silicon nitride, or silicon oxynitride.

According to one aspect of the application, there is provided an electro-optic device such as a modulator that can be completely surrounded by the p-i-n diode, (e.g., using a vertical coupling scheme).

According to one aspect of the application, there is provided an electro-optic device such as a modulator that can be deposited and fabricated either in the front end of a CMOS process (e.g., below the metal interconnect layers) or in the back end of a CMOS process (e.g., above the metal interconnect layer) given that the CMOS temperature requirements are met.

According to one aspect of the application, embodiments are provided that can increase substantially the number of modulators that can fit on a chip by depositing multiple layers of polysilicon.

According to one aspect, there is provided an integrated circuit element for optical data transmission on a microprocessor chip incorporating embodiments of electro-optic devices and/or methods according to the application.

According to one aspect, embodiments according to the application can be used either as a stand alone modulator or as an integrated circuit element.

According to one aspect, embodiments according to the application can be used for exemplary data transmission rates of 10 Gbps or 40 Gbps when used in a 4-channel or 16-channel wavelength division multiplexing (WDM) scheme.

According to one aspect, embodiments according to the application can be used for intra-chip, chip-to-chip, rack-to-rack, and long haul data transmission as part of an electronic, photonic, or electro-optic chip.

Details of the above described embodiments and additional embodiments are set forth in the manuscript entitled, Deposited silicon high-speed integrated electro-optic modulator, which is attached hereto as Appendix A, Exemplary Fabrication Description, which is attached hereto as Appendix B, and additional references, which is attached hereto as Appendix C, each of which forms part of the present disclosure.

Provisional Abstract: Embodiments of devices and methods according to the application use an embedded $p^+n^-n^+$ diode to achieve optical modulation using the free carrier plasma dispersion effect. Embodiments of active optical devices in a deposited microelectronic material can break the dependence on the traditional single layer silicon-on-insulator platform and can lead to monolithic large-scale integration of photonic networks on a microprocessor chip.

Appendix A: Manuscript

Deposited Silicon High-Speed Integrated Electro-Optic Modulator

Abstract: We demonstrate a micrometer-scale electro-optic modulator operating at 2.5 Gbps and 10 dB extinction ratio that is fabricated entirely from deposited silicon. The polycrystalline silicon material exhibits properties that simultaneously enable high quality factor optical resonators and sub-nanosecond electrical carrier injection. We use an embedded $p^+n^-n^+$ diode to achieve optical modulation using the free carrier plasma dispersion effect. Active optical devices in a deposited microelectronic material can break the dependence on the traditional single layer silicon-on-insulator platform and help lead to monolithic large-scale integration of photonic networks on a microprocessor chip.

REFERENCES AND LINKS

1. D. A. B. Miller, "Rationale and challenges for optical interconnects to electronic chips," Proc. IEEE 88, 728-749 (2000).
2. A. Shacham, K. Bergman, and L. P. Carloni, "Photonic Networks-on-Chip for Future Generations of Chip Multiprocessors," IEEE Trans. Comput. 57, 1246-1260 (2008).
3. A. Liu, R. Jones, L. Liao, D. Samara-Rubio, D. Rubin, O. Cohen, R. Nicolaescu, and M. Paniccia, "A high-speed silicon optical modulator based on a metal-oxide-semiconductor capacitor," Nature 427, 615-618 (2004).
4. A. Liu, L. Liao, D. Rubin, H. Nguyen, B. Ciftcioglu, Y. Chetrit, N. Izhaky, and M. Paniccia, "High-speed optical modulation based on carrier depletion in a silicon waveguide," Opt. Express 15, 660-668 (2007).
5. W. M. Green, M. J. Rooks, L. Sekaric, and Y. A. Vlasov, "Ultra-compact, low RF power, 10 Gb/s silicon Mach-Zehnder modulator," Opt. Express 15, 17106-17113 (2007).
6. D. Marris-Morini, L. Vivien, J. M. Fédéli, E. Cassan, P. Lyan, and S. Laval, "Low loss and high speed silicon optical modulator based on a lateral carrier depletion structure," Opt. Express 16, 334-339 (2008).
7. S. J. Spector, M. W. Geis, G. R. Zhou, M. E. Grein, F. Gan, M. A. Popovic, J. U. Yoon, D. M. Lennon, E. P. Ippen, F. Z. Kärtner, and T. M. Lyszczarz, "CMOS-compatible dual-output silicon modulator for analog signal processing," Opt. Express 16, 11027-11031 (2008).
8. Q. Xu, B. Schmidt, S. Pradhan, and M. Lipson, "Micrometer-scale silicon electro-optic modulator," Nature 435, 325-327 (2005).
9. S. Manipatruni, X. Qianfan, B. Schmidt, J. Shakya, and M. Lipson, "High Speed Carrier Injection 18 Gb/s Silicon Micro-ring Electro-optic Modulator," in *Proceedings of Lasers and Electro-Optics Society* (IEEE, 2007), pp. 537-538.
10. M. R. Watts, D. C. Trotter, R. W. Young, and A. L. Lentine, "Ultralow power silicon microdisk modulators and switches," in *5th IEEE International Conference on Group IV Photonics* (IEEE, 2008), pp. 4-6.
11. J.-B. You, M. Park, J.-W. Park, and G. Kim, "12.5 Gbps optical modulation of silicon racetrack resonator based on carrier-depletion in asymmetric p-n diode," Opt. Express 16, 18340-18344 (2008).
12. G. K. Celler and S. Cristoloveanu, "Frontiers of silicon-on-insulator," J. Appl. Phys. 93, 4955-4978 (2003).
13. J. S. Orcutt, A. Khilo, M. A. Popovic, C. W. Holzwarth, B. Moss, H. Li, M. S. Dahlem, T. D. Bonifield, F. X. Kaertner, E. P. Ippen, J. L. Hoyt, R. J. Ram, and V. Stojanovic, "Demonstration of an Electronic Photonic Integrated Circuit in a Commercial Scaled Bulk CMOS Process," in *Conference on Lasers and Electro-Optics* (Optical Society of America, 2008), paper CTuBB3.
14. C. W. Holzwarth, J. S. Orcutt, H. Li, M. A. Popovic, V. Stojanovic, J. L. Hoyt, R. J. Ram, and H. I. Smith, "Localized Substrate Removal Technique Enabling Strong-Confinement Microphotonics in Bulk Si CMOS Processes," in *Conference on Lasers and Electro-Optics* (Optical Society of America, 2008), paper CThKK5.
15. K. Banerjee, S. J. Souri, P. Kapur, and K. C. Saraswat, "3-D ICs: a novel chip design for improving deepsubmicrometer interconnect performance and systems-on-chip integration," Proc. IEEE 89, 602-633 (2001).
16. A. W. Topol, J. D. C. La Tulipe, L. Shi, D. J. Frank, K. Bernstein, S. E. Steen, A. Kumar, G. U. Singco, A. M. Young, K. W. Guarini, and M. Ieong, "Three-dimensional integrated circuits," IBM J. Res. and Dev. 50, 491-506 (2006).
17. M. Beals, J. Michel, J. F. Liu, D. H. Ahn, D. Sparacin, R. Sun, C. Y. Hong, L. C. Kimerling, A. Pomerene, D. Carothers, J. Beattie, A. Kopa, A. Apsel, M. S. Rasras, D. M. Gill, S. S. Patel, K. Y. Tu, Y. K. Chen, and A. E. White, "Process flow innovations for photonic device integration in CMOS," Proc. SPIE 6898, 689804 (2008).
18. R. Amatya, C. W. Holzwarth, H. I. Smith, and R. J. Ram, "Precision Tunable Silicon Compatible Microring Filters," IEEE Photon. Technol. Lett. 20, 1739-1741 (2008).
19. M. W. Geis, S. J. Spector, R. C. Williamson, and T. M. Lyszczarz, "Submicrosecond submilliwatt siliconon-insulator thermooptic switch," IEEE Photon. Technol. Lett. 16, 2514-2516 (2004).
20. J. Liu, M. Beals, A. Pomerene, S. Bernardis, R. Sun, J. Cheng, L. C. Kimerling, and J. Michel, "Waveguide-integrated, ultralow-energy GeSi electroabsorption modulators," Nature Photon. 2, 433-437 (2008).
21. T. Kamins, *Polycrystalline Silicon for Integrated Circuits and Displays,* 2nd ed. (Kluwer, 1998).
22. L. Liao, D. R. Lim, A. M. Agarwal, X. Duan, K. K. Lee, and L. C. Kimerling, "Optical transmission losses in polycrystalline silicon strip waveguides," J. Electron. Mater. 29, 1380-1386 (2000).
23. S. Selvaraja, M. Schaekers, W. Bogaerts, D. V. Thourhout, and R. Baets, "Polycrystalline silicon as waveguide material for advanced photonic applications," in *Proceedings of 11th IEEE/LEOS Benelux Annual Workshop* (IEEE/LEOS, 2007), pp. 19-20.
24. Q. Fang, J. F. Song, S. H. Tao, M. B. Yu, G. Q. Lo, and D. L. Kwong, "Low loss (~6.45 dB/cm) submicron polycrystalline silicon waveguide integrated with efficient SiON waveguide coupler," Opt. Express 16, 6425-6432 (2008).
25. K. Preston, B. Schmidt, and M. Lipson, "Polysilicon photonic resonators for large-scale 3D integration of optical networks," Opt. Express 15, 17283-17290 (2007).
26. K. Preston, P. Dong, B. Schmidt, and M. Lipson, "High-speed all-optical modulation using polycrystalline silicon microring resonators," Appl. Phys. Lett. 92, 151104 (2008).
27. M. Dutoit and F. Sollberger, "Lateral Polysilicon p-n Diodes," J. Electrochem. Soc. 125, 1648-1651 (1978).
28. S. V. Karnik and M. K. Hatalis, "Lateral polysilicon p+–p–n+ and p+–n–n+ diodes," Solid-State Electron. 47, 653-659 (2003).
29. R. Soref and B. Bennett, "Electrooptical effects in silicon," IEEE J. Quantum Electron. 23, 123-129 (1987).
30. C. R. M. Grovenor, "Grain boundaries in semiconductors," J. Phys. C 18, 4079-4119 (1985).
31. S. Manipatruni, Q. Xu, and M. Lipson, "PINIP based high-speed high-extinction ratio micron-size silicon electrooptic modulator," Opt. Express 15, 13035-13042 (2007).
32. Q. Xu, S. Manipatruni, B. Schmidt, J. Shakya, and M. Lipson, "12.5 Gbit/s carrier-injection-based silicon microring silicon modulators," Opt. Express 15, 430-436 (2007).
33. Q. Xu, D. Fattal, and R. G. Beausoleil, "Silicon microring resonators with 1.5-μm radius," Opt. Express 16, 4309-4315 (2008).
34. J. S. Foresi, P. R. Villeneuve, J. Ferrera, E. R. Thoen, G. Steinmeyer, S. Fan, J. D. Joannopoulos, L. C. Kimerling, H. I. Smith, and E. P. Ippen, "Photonic-bandgap microcavities in optical waveguides," Nature 390, 143-145 (1997).

35. B. Schmidt, Q. Xu, J. Shakya, S. Manipatruni, and M. Lipson, "Compact electro-optic modulator on silicon-on-insulator substrates using cavities with ultra-small modal volumes," Opt. Express 15, 3140-3148 (2007).
36. A. T. Voutsas, "Laser Crystallization of Thin Films for Flat Panel Display Applications," in *Recent Advances in Laser Processing of Materials*, J. Perriere, E. Millon, and E. Fogarassy, eds. (Elsevier, New York, 2006), pp. 317-373.

1. Introduction

Photonic networks on a silicon microelectronic chip offer the opportunity to overcome the power and bandwidth limitations in traditional microprocessor interconnects [1, 2]. One critical device for on-chip optical networks is a silicon high-speed waveguide-integrated electro-optic modulator, which converts data from the electrical domain to the optical domain. All previous examples of these modulators (including interferometer [3-7] and microresonator [8-11] geometries) have been fabricated on single-crystalline silicon-on-insulator (SOI) [12]. Reliance on the SOI platform presents two difficult challenges for the integration of optics with microprocessor chips. First, the large-scale integration of hundreds of optical devices would take a prohibitive amount of real estate away from transistors in the same silicon layer, and second, the buried oxide thickness in standard microelectronic SOI is much smaller than the optical wavelength and therefore not appropriate for a waveguide cladding [13, 14]. Here we show the first demonstration of GHz-speed electro-optic modulation in a deposited microelectronic film. The use of deposited material, here polycrystalline silicon (polysilicon), would enable the monolithic integration of optics in a separate layer of a microprocessor chip and provide the flexibility needed for optical system design.

The requirements for both chip real estate and device compatibility indicate that photonic devices and electronic devices should be on separate layers of a microprocessor chip [15]. One option for multilayer integration is to fabricate separate electronic and photonic SOI wafers followed by wafer thinning, bonding, and metallization to connect the layers, however the required processes are not yet cost effective and are therefore not in current production [16]. A simpler, monolithic approach would be to deposit silicon-based layers above the transistor layer and process them into optical devices [17]. Previous active switching or modulating devices in deposited microelectronic films such as silicon nitride or amorphous silicon have relied on the thermo-optic effect [18] which is limited to low speeds in the MHz regime [19]. Liu et al. recently demonstrated a GHz-speed, epitaxially grown GeSi electroabsorption modulator integrated with CMOS circuits [20], however epitaxial growth typically requires a crystalline seed which limits where the material can be grown.

In this work we show integrated electro-optic devices in deposited polysilicon, a standard microelectronic material containing crystalline grains separated by thin amorphous grain boundaries [21]. Previous optical devices in the polysilicon-on-insulator material system included passive waveguides with loss on the order of 10 dB/cm [22-24], optical filters [13, 25], and a recent demonstration of all-optical modulation [26]. Here we demonstrate electrooptic functionality by embedding a $p^+$-$n^-$-$n^+$ diode [27, 28] around a polysilicon ring resonator as shown in FIG. 1. In order to achieve good optical and electrical properties, we use photonic structures with cross sectional dimensions of hundreds of nanometers, on the order of the material grain size [26]. This enables sub-nanosecond carrier injection and optical modulation using the free carrier dispersion effect [29].

FIG. 1. Polysilicon electro-optic modulator device structure. (a) Top view schematic showing the doping regions of the device that form a $p^+$-$n^-$-$n^+$ diode around a ring resonator. (b) Tilted view colorized scanning electron microscope (SEM) image. The polysilicon resonator and 450 nm-wide bus waveguide are buried under 1 μm silicon dioxide. (c) Cross-section schematic of the device (not to scale).

2. Polysilicon Material Properties and Device Fabrication

The polysilicon material system differs from single-crystalline silicon in three critical ways that affect electro-optic modulator design and performance: effective carrier mobility ($\mu_{eff}$), effective free carrier lifetime ($\tau_{fc}$), and optical loss. All three parameters are affected by the grain boundaries that exist throughout the material. For instance, grain boundaries in polysilicon present a potential barrier to the flow of carriers which results in decreased effective carrier mobility $\mu_{eff}$ [21, 30]. Mobility in various phases of silicon ranges from the order of 1,000 $cm^2$/V·s (single crystalline silicon) to less than 1 $cm^2$/V·s (amorphous silicon).

Background doping of the device region is required to ensure sufficient charge injection because intrinsic undoped polysilicon is extremely resistive (corresponding to low mobility μ) [21]. An increase in doping above the grain boundary trap density improves the electrical injection [21, 28], but this is a tradeoff with increased optical loss due to free carrier absorption [29]. In doped polysilicon, some percent of dopant atoms segregate to low energy positions at the grain boundaries where they do not contribute carriers. Additionally, the carriers themselves can fill in grain boundary trap states [21] where they will not contribute to free carrier dispersion. To keep the background free carrier losses low, we conservatively choose an average n-type doping level $N_d \approx 2 \cdot 10^{17}$ $cm^{-3}$. We estimate that this produces a free carrier concentration $n \leq 10^{17}$ $cm^{-3}$ which keeps excess free carrier loss below 4 dB/cm [29].

Grain boundaries and other intragrain defects in polysilicon induce a fast carrier recombination lifetime, which allows a polysilicon modulator to reach a steady state carrier concentration faster than a comparable crystalline silicon device. This lifetime was measured in previous work to be on the order of $\tau_{fc} \approx 100$ ps for a grain size of approximately 300 nm in a 450 nm by 250 nm channel waveguide [26]. In addition to decreased $\tau_{fc}$ and $\mu_{eff}$, optical losses are moderately increased in polysilicon due to scattering and absorption of light at the grain boundaries [22], though resonator quality factors of 20,000 are achievable [25] which is more than sufficient for a modulator device [9].

Fabrication of the devices is performed using standard microelectronic processes. We start with a silicon wafer and grow a 3 μm thermal oxide isolation layer. We then deposit a 270 nm layer of amorphous silicon by low pressure chemical vapor deposition (LPCVD) at 550° C. and crystallize the film into polysilicon by a thermal anneal at a maximum temperature of 1100° C. Background doping of the resonator area is done by opening windows in positive e-beam resist and performing Phosphorus ion implantation with a dose of $4.7 \times 10^{12}$ $cm^{-2}$ and energy of 130 keV. We pattern waveguides and resonators using e-beam lithography and XR-1541 resist, and transfer the pattern using chlorine-based inductively coupled plasma reactive ion etching (ICP-RIE), leaving a 40 nm slab of silicon for electrical access. We dope $p^+$ and $n^+$ contact regions in the slab by $BF_2$ and Phosphorus ion implantation at $1.2 \times 10^{15}$ $cm^{-2}$ dose and clad the structures in 1 μm silicon dioxide by plasma enhanced chemical vapor deposition (PECVD). We then anneal the sample in $N_2$ for 30 minutes at 600° C., 15 minutes at 900° C., and 15 seconds at 1050° C. for silicon regrowth and dopant activation. (By ending with the high temperature rapid thermal anneal, we maximize the number of dopant ions that are electrically active [21].) Finally we open vias to the contact regions in order to form nickel silicide contacts and aluminum pads using e-beam evaporation and liftoff steps. The device consists of a 10 µm radius polysilicon ring resonator embedded in a 40 nm tall p$^+$-n$^-$-n$^+$ diode and laterally coupled to a polysilicon waveguide. A cross-sectional schematic, top view schematic, and top view microscope image are shown in FIG. 1.

3. Results

We first analyze the electro-optic device with DC measurements. Optical measurements are performed using a tunable infrared laser coupled through a polarization controller to a tapered lens fiber. Light is coupled on and off chip via nano-taper mode converters. Output from the chip is collected by an objective lens, passed through a polarization filter, and focused on a photodetector. FIG. 2(a) shows a measured resonance at $\lambda_0$=1550.35 nm with spectral 3 dB width $\Delta\lambda_{FWHM}$=0.45 nm, quality factor Q=$\lambda_0/\Delta\lambda_{FWHM}$=3,400 and 16 dB extinction ratio.

Other devices from this fabrication run exhibited quality factors exceeding 10,000. We perform a DC electrical measurement on the device to obtain a diode IV curve shown in FIG. 2(b). The device exhibits an on-resistance of approximately 3.5 kΩ, which includes contact resistance at the p$^+$ and n$^+$ regions and series resistance through the lightly doped waveguide and slab regions.

FIG. 2. DC optical and electrical measurements. (a) Wavelength scan showing through port transmission for quasi-TM polarization with quality factor Q=$\lambda_0/\Delta\lambda_{FWHM}$=3,400 and 16 dB extinction ratio. (b) Electrical IV curve demonstrating DC diode characteristics.

We demonstrate 2.5 Gbps modulation and measure a 10 dB modulation depth with a NRZ 2$^7$-1 PRBS electrical signal applied with a ±4V swing and a 4V DC bias. For AC measurements, output light from the chip is collimated, coupled to a fiber, passed through a fiber pre-amplifier and tunable filter, and recorded by an oscilloscope with a 20 GHz photodetector. The oscilloscope is triggered to the pattern generator which provides the NRZ electrical signal to a high-speed amplifier and bias T circuit. By forward biasing the diode and injecting free carriers into the ring, the resonant wavelength blue shifts and changes the probe wavelength transmission from low to high. FIGS. 3(a) and (b) show the optical transmission and frame-averaged optical eye diagram when the wavelength is tuned to minimize the offstate transmission. The slight overshoot and oscillation of the high transmission of the waveform in FIG. 3 is caused by electrical impedance mismatch, coupled with the fact that the voltage swing here is not sufficient to reach full optical transmission. Comparing the measured 10 dB extinction ratio in FIG. 3(a) to the 16 dB extinction on resonance in FIG. 2(a), we estimate a 6 dB insertion loss and a maximum wavelength shift $\Delta\lambda\approx$130 pm. This $\Delta\lambda$ corresponds to an effective index shift $\Delta n_{eff}$=$n_g$ $\Delta\lambda/\lambda_0$=3.66×10$^{-4}$ given a group index $n_g$=4.36 found with a finite difference modesolver program. Based on modesolver simulation, this $\Delta n_{eff}$ is caused by a silicon refractive index change $\Delta n$=3.7×10$^{-4}$, which is caused by a carrier injection level $\Delta N$=$\Delta P$=8.4×10$^{16}$ cm$^{-3}$ [29]. We estimate energy consumption of 950 fJ/bit and power consumption of 2.4 mW based on the voltage swing, bit rate, carrier lifetime, device size, and charge injection levels.

The carrier mobility µ can be estimated from the measured DC on-resistance using the formula [28]:

$$R_{on} = \frac{1}{q\mu n w}\left(\frac{L_{slab}}{h_{slab}} + \frac{L_{wg}}{h_{wg}}\right) \quad (1)$$

where q is the electron charge, n is the free carrier concentration (~10$^{17}$ cm$^{-3}$), w is the circumference of the ring (62.8 µm), $L_{slab}$ is the total cross-section length of the slab region between the n$^+$ and p$^+$ regions (1.55 µm), $L_{wg}$ is the width of the waveguide (0.45 µm), $h_{slab}$ is the height of the polysilicon slab (40 nm), and $h_{wg}$ is the waveguide height (270 nm). By attributing the full 3.5 kΩ to material resistance, we calculate a first-order lower bound for the carrier mobility µ=100 cm$^2$/V·s. This is only one order of magnitude lower than values in crystalline silicon [21], which explains why the electrical performance can approach that seen in crystalline SOI devices.

We model the operation of the device using Silvaco Atlas simulation software and show excellent agreement with experimental results. As a first order model of the effect of grain boundaries on the polysilicon electrical properties, we define silicon bulk material properties within our device, including a free carrier lifetime $\tau_{fc}$=80 ps and an effective carrier mobility $\mu_n$=100 cm$^2$/V·s for electrons and $\mu_p$=50 cm$^2$/V·s for holes. We use Shockley-Read-Hall and Klaassen models for carrier recombination and mobility, and the surface recombination velocity is taken to be 16,000 cm/s which is consistent with SOI modeling [31]. We apply the same voltage signal as was used in FIG. 3(a) (without ringing) and solve for the transient charge concentrations $\Delta N(t)$ and $\Delta P(t)$ in the waveguide region. These values are then converted to a wavelength shift $\Delta\lambda(t)$ and excess loss $\Delta\alpha(t)$ which are put into a Lorentzian resonance model to find the optical response. Note that a time domain optical model is not required because the cavity photon lifetime $\tau_p$=Q$\lambda$/(2$\pi$c)=2.7 ps is much less than the charge injection time. The result for optical transmission is shown in FIG. 3(c), which demonstrates excellent agreement in rise time, fall time, and extinction ratio with the experimental results in FIG. 3(a).

FIG. 3. Electro-optic response of the polysilicon modulator. (a) Optical transmission and (b) frame-averaged optical eye diagram for NRZ 2.5 Gbps 2$^7$-1 PRBS signal. (c) Simulation of electro-optic response using bulk distributed material parameters $\tau_{fc}$=80 ps, $\mu_n$=100 cm$^2$/Vs, and $\mu_p$=50 cm$^2$/Vs.

Simulation Parameters:

$\tau_{fc}$=80 ps $\mu_n$=100 cm$^2$/V·s $\mu_p$=50 cm$^2$/V·s

SRV$_{n,p}$=16,000 cm/s

4. Discussion

The polysilicon device shown here demonstrates speed and energy consumption (2.5 Gbps and 950 fJ/bit) approaching those in state-of-the-art crystalline silicon microresonator devices (~20 Gbps and ~100 fJ/bit [9, 10]). The reduced carrier mobility µ in polysilicon necessitates the use of a slightly higher forward bias voltage for the on-state which increases power consumption, however this is partially compensated by the fast carrier recombination [26] which eliminates the need for a reverse bias voltage for the off-state. The optical transmission in FIG. 3 exhibits a 90%-10% fall time of 120 ps with 0V applied for the off-state. The 10%-to-90% rise time in FIG. 3 is 150 ps, indicating a possible bit rate >5 Gbps. With moderately improved Q and electrical characteristics, we expect the insertion loss could be reduced to near 0 dB and the speed increased to tens of Gbps using pre-emphasis techniques [32].

Electrical properties of the device can be improved by two main approaches: optimizing the background doping concentration and decreasing the device size. The background doping strongly influences the electrical mobility and resistance obtained in the film, which in turn strongly affect the speed and power consumption [21, 30]. Optimal conditions may be found at a higher doping concentration $N_d$ that further improves the mobility without negatively affecting off-state Q. Energy consumption can be greatly reduced to potentially tens of fJ/bit by decreasing the size of the resonator to smaller microring [33] or 1-D cavity geometries [34, 35], since switching energy scales inversely with resonator size [33].

The primary consideration for photonic integration with the CMOS process flow is the temperature required for device fabrication [17]. The highest temperature in our process is the 1100° C. crystallization anneal which is used to maximize the grain size and minimize the optical loss [22]. Because of the relatively high temperature, these devices would need to be fabricated before any doping or silicidation is performed on the silicon transistor layer. Note however that a high temperature thermal anneal is not fundamentally required for large grain polycrystalline films. Crystallization by nanosecond excimer laser annealing can be used to achieve grain sizes of micrometers without any steady state heating of the substrate. This technique is currently used extensively in the thin film transistor industry to produce polycrystalline films on glass and plastic substrates [36]. With a low-temperature process below 450° C., active polysilicon devices could be integrated with low loss amorphous silicon or silicon nitride waveguides on top of the CMOS metal interconnect layers. This type of post-backend processing would enable optical functionality on a CMOS chip with minimal changes to the microelectronic process flow.

5. Conclusion

For the first time to our knowledge, we have demonstrated GHz-speed electro-optic modulation in a deposited microelectronic material. The polycrystalline silicon exhibits optical and electrical properties which enable modulation of the transmission through a microring resonator on a 150 ps timescale. This work represents a step towards adapting high performance silicon photonic devices for monolithic large-scale integration with standard CMOS microelectronics.

Acknowledgments

This work was supported by Intel Corporation and supervised by M. Reshotko. The authors gratefully acknowledge C. Manolatou for the use of her finite difference code. This work was performed in part at the Cornell NanoScale Facility, a member of the National Nanotechnology Infrastructure Network, which is supported by the National Science Foundation (Grant ECS-0335765).

Appendix B: Examples of Fabrication Methods and Device Embodiments

Exemplary Fabrication Description

Fabrication of the exemplary devices is performed using standard microelectronic processes. We start with a silicon wafer and grow a 3 μm thermal oxide isolation layer. We then deposit a 270 nm layer of amorphous silicon by low pressure chemical vapor deposition (LPCVD) at 550° C. and crystallize the film into polysilicon by a thermal anneal at a maximum temperature of 1100° C. Background doping of the resonator area is done by opening windows in positive e-beam resist and performing Phosphorus ion implantation with a dose of $4.7 \times 10^{12}$ cm$^{-2}$ and energy of 130 keV. We pattern waveguides and resonators using e-beam lithography and XR-1541 resist, and transfer the pattern using chlorine-based inductively coupled plasma reactive ion etching (ICP-RIE), leaving a 40 nm slab of silicon for electrical access. We dope p$^+$ and n$^+$ contact regions in the slab by BF$_2$ and Phosphorus ion implantation at $1.2 \times 10^{15}$ cm$^{-2}$ dose and clad the structures in 1 μm silicon dioxide by plasma enhanced chemical vapor deposition (PECVD). We then anneal the sample in N$_2$ for 30 minutes at 600° C., 15 minutes at 900° C., and 15 seconds at 1050° C. for silicon regrowth and dopant activation. (By ending with the high temperature rapid thermal anneal, we maximize the number of dopant ions that are electrically active.) Finally we open vias to the contact regions in order to form nickel silicide contacts and aluminum pads using e-beam evaporation and liftoff steps. The device consists of a 10 μm radius polysilicon ring resonator embedded in a 40 nm tall p$^+$-n$^-$-n$^+$ diode and laterally coupled to a polysilicon waveguide. A cross-sectional schematic, top view schematic, and top view microscope image are shown in FIG. 1.

Additional Exemplary Fabrication Description

1) Formation of lower cladding. We use 3 microns, but it can be any value above ~1 micron. We do it through thermal oxidation (a high temperature process) for demonstration purposes, but it can be done by low temperature plasma enhanced chemical vapor deposition (PECVD) at 400 C or below.

2) Amorphous silicon deposition. We use 270 nm. It could be anywhere from 100 nm to 500 nm. We use low pressure chemical vapor deposition (LPCVD) at 550 C. It could be done at lower temperatures by PECVD or e-gun evaporation or sputtering.

3a) The top surface of the amorphous silicon can be encapsulated with another material such as silicon nitride (to prevent oxygen diffusion) or silicon dioxide (to prevent the surface from changing shape).

3b) Crystallize the material into polysilicon. Here we do this with a high temperature anneal at 1100 C. It can also be done by transient laser annealing—this is a very different technique which we now have working after 2 years of work—possibly requiring its own invention disclosure because it is so different.

4) Background doping of the material. This step is necessary to improve the electrical characteristics of the material. We use Phosphorus (n-type) dopant with a concentration around $10^{17}$ cm$^{-3}$. Different dopants could be used, and different concentrations (probably higher) could be used.

The following steps can be similar to electro-optic modulator fabrication in crystalline silicon:

5) Lithography and etching to form the waveguides and resonators. Etch down to leave a 50 nm slab (25-75 nm is probably feasible). We use chlorine-based inductively coupled plasma reactive ion etching (ICP-RIE), but several other etch processes are possible (HBr, SF$_6$/C$_4$F$_8$)

5b) A second lithography and etching step may also be used to remove the slab where you don't need it. This is important for isolating different electrical devices.

6) Heavily dope the p$^+$ and n$^+$ contact regions of the electrical diode. Dopant concentrations can be anywhere from $10^{17}$ to $10^{21}$ cm$^{-3}$.

7) Anneal the device in several steps: 600° C. for 30 minutes for silicon regrowth, then 15 minutes at 900° C. and 15 seconds at 1050° C. for dopant activation. The specific times and temperatures could vary widely.

If doing a low temperature laser annealed device, we will do all of these functions in one low-energy laser annealing step 8) Clad the device in PECVD oxide. We use 1 micron. It could be from, for example, 1-3 microns.

9) Open vias (holes in the oxide) to connect to the device. Deposit nickel (could be different thicknesses or various other metals) and anneal to form a silicide, then deposit aluminum or another metal to form the electrical contact.

It is implied that there are many lithography steps in between all the steps described here. Each lithography step uses a specific type of e-beam resist, thickness, baking time and temperature, and development time. There are many different types of resist chemistries, etc, but the point is just to mask off certain areas of the chip when you do your etching, implantation, etc.

Exemplary physical devices could take many forms, but they all involve some type of optical cavity where light is trapped, with an electrical diode across the device. Different types of exemplary optical cavities include ring resonators, microdisks, and photonic crystals.

Exemplary Embodiments According to the Application

Instead of a being laterally coupled to a polysilicon waveguide, the modulator could be vertically coupled to waveguides that are either above or below the modulator. Possible materials for the bus waveguides include crystalline silicon, amorphous silicon, silicon nitride, and silicon oxynitride. Waveguides below the modulator could be fabricated by lithography and etching and covered in silicon dioxide. A planarization step such as chemical-mechanical polishing (CMP) could be used before deposition of the polysilicon modulator layer on top of the waveguides. Fabrication of the modulator is then carrier out as described previously. Waveguides above the modulator could be made by depositing the waveguide material on top of a silicon dioxide layer covering the modulator. Waveguides could then be patterned by lithography and etching. By working with deposited materials, we open up the possibility for high-density, 3d-integrated optical networks on a silicon chip.

In order to build an optical network on top of a finished CMOS microprocessor chip, the fabrication temperature must be kept below 450° C. This is a desirable case because no changes would need to be made to the CMOS process flow, and optical functionality can be added after the electrical devices are completely finished. The highest temperature in our current process is the 1100° C. crystallization anneal which is used to maximize the grain size and minimize the optical loss. Because of the relatively high temperature, these devices would need to be fabricated before any doping or silicidation is performed on the silicon transistor layer of a CMOS chip. Note however that a high temperature thermal anneal is not fundamentally required for large grain-size polycrystalline films. Crystallization by nanosecond excimer laser annealing can be used to achieve grain sizes of micrometers without any steady state heating of the substrate. This technique is currently used extensively in the thin film transistor industry to produce polycrystalline films on glass and plastic substrates. The top silicon layer is heated by absorption of a UV laser pulse, and the underlying substrate does not undergo steady-state heating. In this way, active silicon electro-optic modulators could be fabricated on any low-temperature substrate, including glass, plastic, or a finished CMOS wafer.

In this section we discussed the possibility of low-temperature formation of the polysilicon by laser annealing. Exemplary steps here include:

1) deposition of thin amorphous silicon (~150 nm) by e-gun evaporation 2) depositing a silicon dioxide layer (~50 nm or ~150 nm) to prevent the surface from getting too rough 3) excimer laser annealing to crystallize the material 4) remove the silicon dioxide by dipping in HF acid 5) chemical-mechanical polishing to reduce the surface roughness, ending at a target thickness of ~100 nm polysilicon 6) continue with fabrication (etching, doping, metal contact, etc.)

Appendix of Illustrative Embodiments

An illustrative collection of examples of inventive concepts of the present disclosure may thereby be provided as follows:

A1. A device comprising:
  a substrate;
  a first waveguide comprising polycrystalline silicon positioned on the substrate;
  a first optical resonator comprising polycrystalline silicon positioned on the substrate;
  a first doped semiconducting region comprising polycrystalline silicon positioned proximate to the first optical resonator; and
  a second doped semiconducting region comprising polycrystalline silicon positioned proximate to the first optical resonator;
  wherein the first optical resonator is communicatively coupled to the first waveguide.

A2. The device of A1, wherein the first doped semiconducting region is a p-type semiconducting region, and the second doped semiconducting region is an n-type semiconducting region.

A3. The device of A2, wherein the p-type semiconducting region comprises silicon doped with one or more of boron, aluminum, or gallium.

A4. The device of A2, wherein the n-type semiconducting region comprises silicon doped with one or more of phosphorus, arsenic, or antimony.

A5. The device of A2, wherein the first optical resonator is doped with a background doping.

A6. The device of A5, wherein the background doping has a concentration of between $10^{11}$ and $10^{18}$ charge carriers per cubic centimeter, and the p-type semiconducting region and the n-type semiconducting region are doped with a concentration of between $10^{14}$ and $10^{22}$ charge carriers per cubic centimeter.

A7. The device of A1, wherein the first waveguide comprises polycrystalline silicon, the first optical resonator comprises polycrystalline silicon background doped with a background donor dopant, the first doped semiconducting region comprises polycrystalline silicon doped with an acceptor dopant at a higher density than the background donor dopant in the first optical resonator, and the second doped semiconducting region comprises polycrystalline silicon doped with a donor dopant at a higher density than the background donor dopant in the first optical resonator.

A8. The device of A1, further comprising a first conductive contact connected to the first doped semiconducting region, and a second conductive contact connected to the second doped semiconducting region.

A9. The device of A8, further comprising an insulating layer disposed over the first optical resonator, the first doped semiconducting region, the second doped semiconducting region, and the first waveguide, wherein the first conductive contact and the second conductive contact extend through the insulating layer.

A10. The device of A8, further comprising a metal interconnect layer connected to the first conductive contact and the second conductive contact.

A11. The device of A1, wherein the first optical resonator comprises a ring resonator, the first doped semiconducting region is positioned interior to the ring resonator, and the second doped semiconducting region and the first waveguide are positioned exterior to the ring resonator.

A12. The device of A1, wherein the first optical resonator comprises at least one of a ring resonator, a microdisk, or a photonic crystal.

A13. The device of A1, wherein the first waveguide has a cross-sectional dimension within a range of 100 to 2,000 nanometers.

A14. The device of A1, further comprising additional photonic structures in a system for multiplexing data in one or more of time, phase, amplitude, or wavelength.

A15. The device of A1, further comprising one or more additional optical resonators that are coupled to the first waveguide and that are comprised, with the first optical resonator, in an array of optical resonators.

A16. The device of A15, wherein the optical resonators in the array have a plurality of different radii, thereby enabling multiplexing data in multiple wavelengths in the first waveguide.

A17. The device of A15, wherein the array comprises tuning mechanisms associated with a plurality of the optical resonators that enable the optical resonators to be in communication with the first waveguide at different times, thereby enabling time multiplexing in the first waveguide.

A18. The device of A1, wherein the substrate is formed from at least one of silicon, germanium, or a compound semiconductor.

A19. The device of A1, wherein the first optical resonator is positioned vertically proximate to the first waveguide on different deposited layers of the substrate.

A20. The device of A1, further comprising a tuning mechanism based on at least one of an electrical, thermal, magnetic, photoelectric or microfluidic effect.

A21. The device of A1, wherein the first waveguide is formed at least mostly from at least one of polycrystalline silicon, silicon nitride, or hydrogenated amorphous silicon.

A22. The device of A1, further comprising a second waveguide positioned on the substrate, wherein the first optical resonator is also communicatively coupled to the second waveguide, such that the device may function as a switch between the first waveguide and the second waveguide.

A23. A method comprising:
providing an insulating base layer;
forming an amorphous semiconductor layer on the base layer;
modifying at least a portion of the amorphous semiconductor layer into a polycrystalline semiconductor layer;
background doping a target area of the polycrystalline semiconductor layer;
forming a waveguide and a resonator in the polycrystalline semiconductor layer, comprising at least one step of lithography and/or etching, wherein the resonator is formed in the background doped target area;
forming a p-type region in the polycrystalline semiconductor layer proximate to the resonator, comprising at least one step of applying a p-type dopant; and
forming an n-type region in the polycrystalline semiconductor layer proximate to the resonator, comprising at least one step of applying an n-type dopant.

A24. The method of A23, wherein forming the amorphous semiconductor layer on the base layer comprises depositing amorphous silicon using low pressure chemical vapor deposition.

A25. The method of A23, wherein modifying at least a portion of the amorphous semiconductor layer into a polycrystalline semiconductor layer comprises annealing the amorphous semiconductor layer, wherein the annealing comprises applying a laser with a wavelength of less than or equal to 400 nanometers and a pulse period of less than or equal to 200 nanoseconds to the amorphous semiconductor layer.

A26. The method of A23, further comprising annealing the polycrystalline semiconductor layer after forming the waveguide, the resonator, the p-type region, and the n-type region in the polycrystalline semiconductor layer, wherein annealing the polycrystalline semiconductor layer comprises baking the polycrystalline semiconductor layer for two or more periods at temperatures within a range of 600 to 1,050 degrees Celsius.

A27. The method of A23, wherein background doping the target area of the polycrystalline semiconductor layer comprises using phosphorus ion implantation; applying the p-type dopant for forming the p-type region comprises using boron difluoride implantation; and applying the n-type dopant for forming the n-type region comprises using phosphorus ion implantation.

A28. The method of A23, wherein the amorphous semiconductor layer is formed with a thickness within a range of 100 to 500 nanometers, and wherein forming the resonator comprises etching the polycrystalline semiconductor layer to form slabs with a thickness within a range of 25 to 75 nanometers defining an exterior of the resonator.

A29. The method of A23, further comprising: providing an insulating cladding on the polycrystalline semiconductor layer; forming vias in contact with the p-type region and the n-type region through the insulating cladding; and forming conductive contacts on surfaces of the vias.

While various embodiments have been particularly shown and described, it will be understood by those skilled in the art that various combinations of the disclosed elements or changes in detail may be made without departing from the spirit and scope of the claims. Further, while in numerous cases herein wherein systems and apparatuses and methods are described as having a certain number of elements it will be understood that such systems, apparatuses and methods can be practiced with fewer than or more than the mentioned certain number of elements. Also, while a number of particular embodiments have been described, it will be understood that features and aspects that have been described with reference to each particular embodiment can be used with each remaining particularly described embodiment. Many variations may also be made within the realm of different embodiments, limited only by the scope of the claims as recited below.

What is claimed is:

1. A device comprising:
a substrate;
a first waveguide comprising polycrystalline silicon positioned on the substrate;
a first optical resonator comprising polycrystalline silicon positioned on the substrate, said first optical resonator communicatively coupled to said first waveguide;
a first doped semiconducting region having a first doping concentration comprising polycrystalline silicon positioned proximate to the first optical resonator; and a second doped semiconducting region having a second doping concentration comprising polycrystalline silicon positioned proximate to the first optical resonator; and a third doped region disposed within said first optical resonator, said third doped region comprising a background doping and having a doping concentration less than said first doping concentration and less than said second doping concentration.

2. The device of claim 1, wherein the first doped semiconducting region is a p-type semiconducting region, and the second doped semiconducting region is an n-type semiconducting region.

3. The device of claim 2, wherein the p-type semiconducting region comprises silicon doped with one or more of boron, aluminum, or gallium.

4. The device of claim 2, wherein the n-type semiconducting region comprises silicon doped with one or more of phosphorus, arsenic, or antimony.

5. The device of claim 2, wherein said background doping of said third doped region comprises a $n^-$ background doping and said device comprises a $p^+\ n^-\ n^+$ diode.

6. The device of claim 5, wherein the background doping has a concentration of between $10^{11}$ and $10^{18}$ charge carriers per cubic centimeter, and the p-type semiconducting region and the n-type semiconducting region are doped with a concentration of between $10^{14}$ and $10^{22}$ charge carriers per cubic centimeter.

7. The device of claim 1, wherein the first optical resonator comprises polycrystalline silicon background doped with a background donor dopant, the first doped semiconducting region comprises polycrystalline silicon doped with an acceptor dopant at a higher density than the background donor dopant in the first optical resonator, and the second doped semiconducting region comprises polycrystalline silicon doped with a donor dopant at a higher density than the background donor dopant in the first optical resonator.

8. The device of claim 1, further comprising a first conductive contact connected to the first doped semiconducting region, and a second conductive contact connected to the second doped semiconducting region.

9. The device of claim 8, further comprising an insulating layer disposed over the first optical resonator, the first doped semiconducting region, the second doped semiconducting region, and the first waveguide, wherein the first conductive contact and the second conductive contact extend through the insulating layer.

10. The device of claim 8, further comprising a metal interconnect layer connected to the first conductive contact and the second conductive contact.

11. The device of claim 1, wherein the first optical resonator comprises a ring resonator, the first doped semiconducting region is positioned interior to the ring resonator, and the second doped semiconducting region and the first waveguide are positioned exterior to the ring resonator.

12. The device of claim 1, wherein the first optical resonator comprises at least one of a ring resonator, a microdisk, or a photonic crystal.

13. The device of claim 1, wherein the first waveguide has a cross-sectional dimension within a range of 100 to 2,000 nanometers.

14. The device of claim 1, further comprising additional photonic structures in a system for multiplexing data in one or more of time, phase, amplitude, or wavelength.

15. The device of claim 1, further comprising one or more additional optical resonators that are coupled to the first waveguide and that are comprised, with the first optical resonator, in an array of optical resonators.

16. The device of claim 15, wherein the optical resonators in the array have a plurality of different radii, thereby enabling multiplexing data in multiple wavelengths in the first waveguide.

17. The device of claim 15, wherein the array comprises tuning mechanisms associated with a plurality of the optical resonators that enable the optical resonators to be in communication with the first waveguide at different times, thereby enabling time multiplexing in the first waveguide.

18. The device of claim 1, wherein the substrate is formed from at least one of silicon, germanium, or a compound semiconductor.

19. The device of claim 1, wherein the first optical resonator is positioned vertically proximate to the first waveguide on different deposited layers of the substrate.

20. The device of claim 1, further comprising a tuning mechanism based on at least one of an electrical, thermal, magnetic, photoelectric or microfluidic effect.

21. The device of claim 1, wherein the first waveguide is formed at least mostly from at least one of polycrystalline silicon, silicon nitride, or hydrogenated amorphous silicon.

22. The device of claim 1, further comprising a second waveguide positioned on the substrate, wherein the first optical resonator is also communicatively coupled to the second waveguide, such that the device may function as a switch between the first waveguide and the second waveguide.

* * * * *